(12) United States Patent
Schaaf et al.

(10) Patent No.: US 9,067,374 B2
(45) Date of Patent: Jun. 30, 2015

(54) METHOD AND APPARATUS FOR APPLYING FILM MATERIAL TO ELONGATE MEMBERS

(71) Applicant: The Boeing Company, Chicago, IL (US)

(72) Inventors: America O. Schaaf, Seattle, WA (US); Richard A. Miller, Auburn, WA (US); Donald A. Anderson, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 345 days.

(21) Appl. No.: 13/690,809

(22) Filed: Nov. 30, 2012

(65) Prior Publication Data

US 2014/0150964 A1 Jun. 5, 2014

(51) Int. Cl.

| B65H 35/02 | (2006.01) |
|---|---|
| B29D 99/00 | (2010.01) |
| B29C 70/30 | (2006.01) |
| B29C 63/02 | (2006.01) |
| B29L 31/00 | (2006.01) |

(52) U.S. Cl.
CPC ............... *B29D 99/001* (2013.01); *B29C 70/30* (2013.01); *B29C 63/024* (2013.01); *B29L 2031/003* (2013.01); *B29C 2793/00* (2013.01)

(58) Field of Classification Search
CPC ............... B64C 1/064; B65H 35/0013; B65H 35/0086; B65H 35/02
USPC ......... 156/267, 574, 523, 525, 577, 259, 270, 156/271
See application file for complete search history.

(56) References Cited

U.S. PATENT DOCUMENTS

| 3,522,132 | A | * | 7/1970 | Cardis ........................... 156/494 |
| 4,475,976 | A | * | 10/1984 | Mittelstadt et al. ........... 156/286 |
| 4,699,683 | A | | 10/1987 | McCowin |

(Continued)

FOREIGN PATENT DOCUMENTS

| DE | 1924971 A1 | 9/1970 |
| EP | 0167377 A2 | 1/1986 |

(Continued)

OTHER PUBLICATIONS

PCT Search Report, dated Jan. 3, 2014, regarding Application No. PCT/US2013/062528, 6 pages.

(Continued)

Primary Examiner — Linda L Gray
(74) Attorney, Agent, or Firm — Yee & Associates, P.C.

(57) ABSTRACT

An apparatus including a carriage adapted to be mounted on and movable along the elongate composite stringer, and a compaction roller mounted on th carriage for compacting film material against the flange surface as the carriage moves along the stringer. The apparatus also includes a film feed roll assembly on the carriage adapted to hold a quantity of film material and to dispense the film material to the compaction roller. The apparatus also includes a take-up reel on the carriage adapted for taking up a backing on the film material as the film material is being dispensed to the compaction roller, a heater on the carriage for heating the flange surface as the carriage moves along the composite stringer, and a film trimmer for trimming edges of the film material to match a contour of the composite stringer after the film material has been compacted against the flange surface.

13 Claims, 23 Drawing Sheets

(56) References Cited

U.S. PATENT DOCUMENTS

| | | |
|---|---|---|
| 4,851,076 A | 7/1989 | Manusch et al. |
| 4,877,471 A | 10/1989 | McCowin et al. |
| 5,049,229 A | 9/1991 | Czech |
| 5,310,445 A | 5/1994 | Tucker |
| 5,346,580 A | 9/1994 | Elges et al. |
| 5,700,347 A | 12/1997 | McCowin |
| 6,096,164 A | 8/2000 | Benson et al. |
| 6,764,754 B1 | 7/2004 | Hunter et al. |
| 7,117,915 B2 | 10/2006 | Rolion |
| 7,213,629 B2 | 5/2007 | Ledet et al. |
| 7,419,031 B2 | 9/2008 | Liguore et al. |
| 7,681,615 B2 | 3/2010 | McCowin |
| 7,766,063 B2 | 8/2010 | Lauder et al. |
| 2005/0092425 A1 | 5/2005 | Abe et al. |
| 2005/0194210 A1 | 9/2005 | Panossian |
| 2006/0118244 A1 | 6/2006 | Zaballos et al. |
| 2007/0069080 A1 | 3/2007 | Rassaian et al. |
| 2008/0277057 A1 | 11/2008 | Montgomery et al. |
| 2008/0282863 A1 | 11/2008 | McCowin |
| 2010/0084087 A1* | 4/2010 | McCowin et al. ............ 156/267 |
| 2013/0032287 A1* | 2/2013 | Hagman et al. ............... 156/267 |

FOREIGN PATENT DOCUMENTS

| | | |
|---|---|---|
| EP | 0267396 B2 | 2/1994 |
| EP | 1342555 A1 | 10/2003 |
| WO | 9922932 A1 | 5/1999 |
| WO | 02070232 A1 | 9/2002 |
| WO | 2006021601 A1 | 3/2006 |

OTHER PUBLICATIONS

PCT Search Report, dated Dec. 13, 2005, regarding Application No. PCT/ES2005/000408, 2 pages.

* cited by examiner

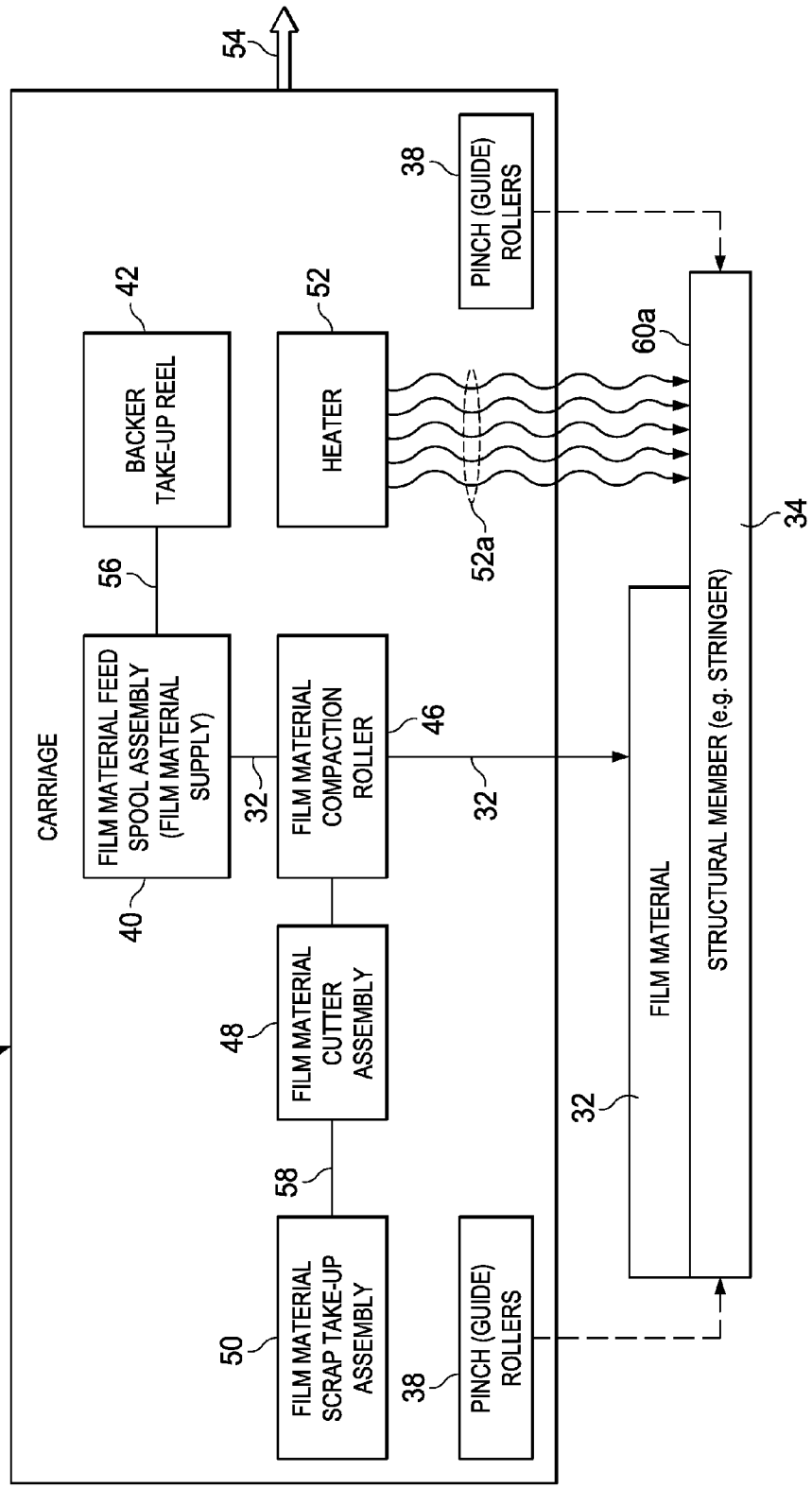

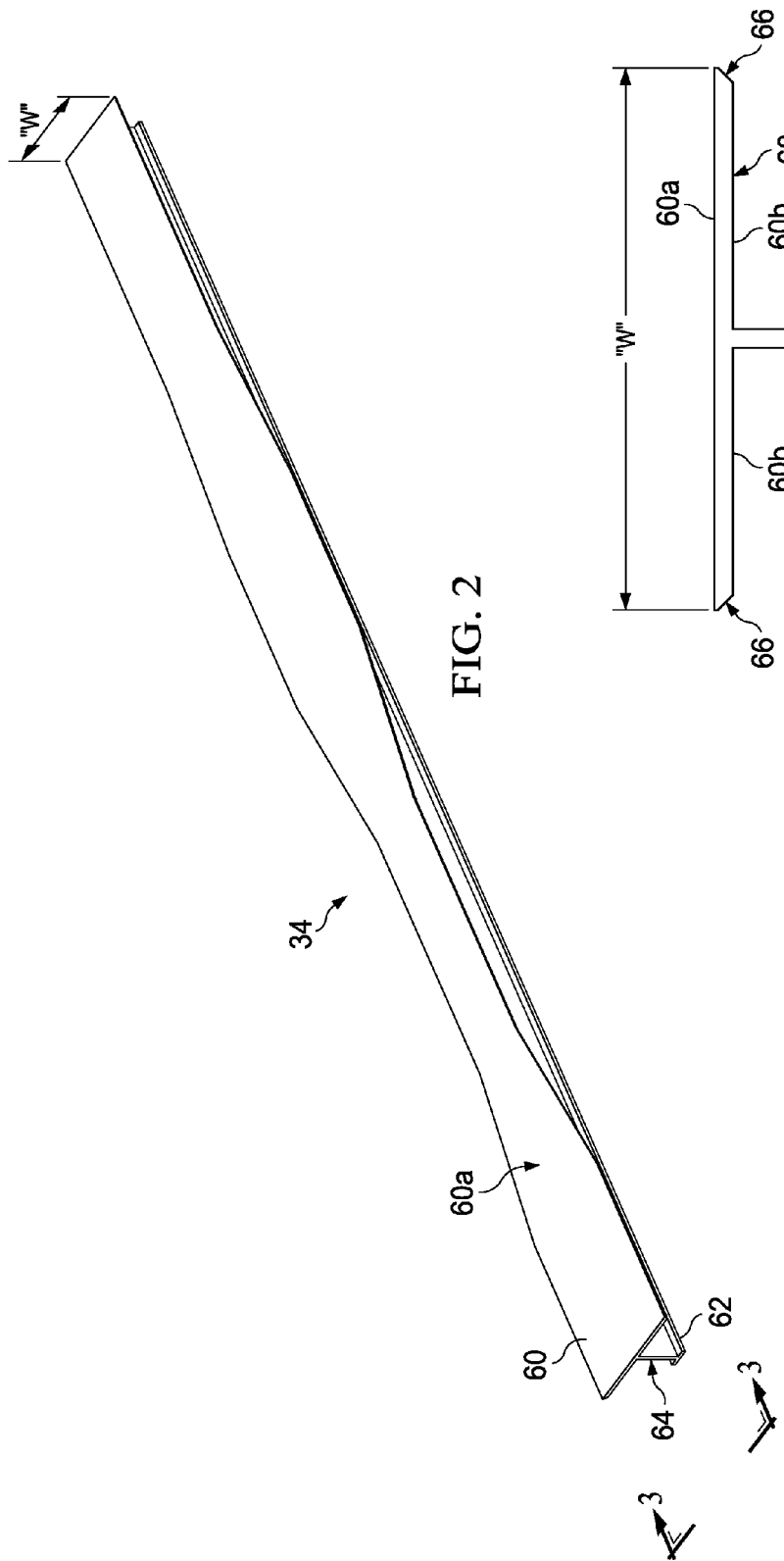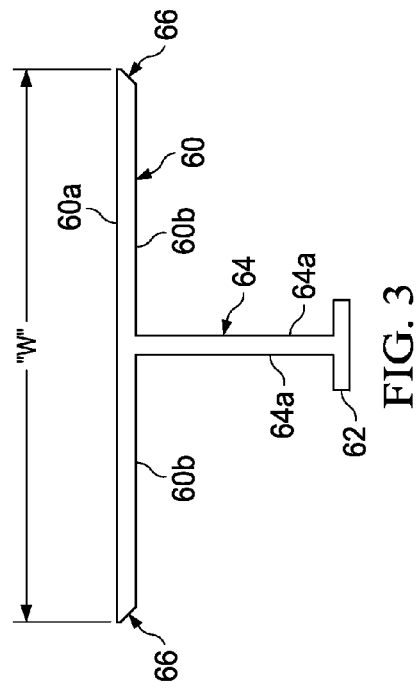

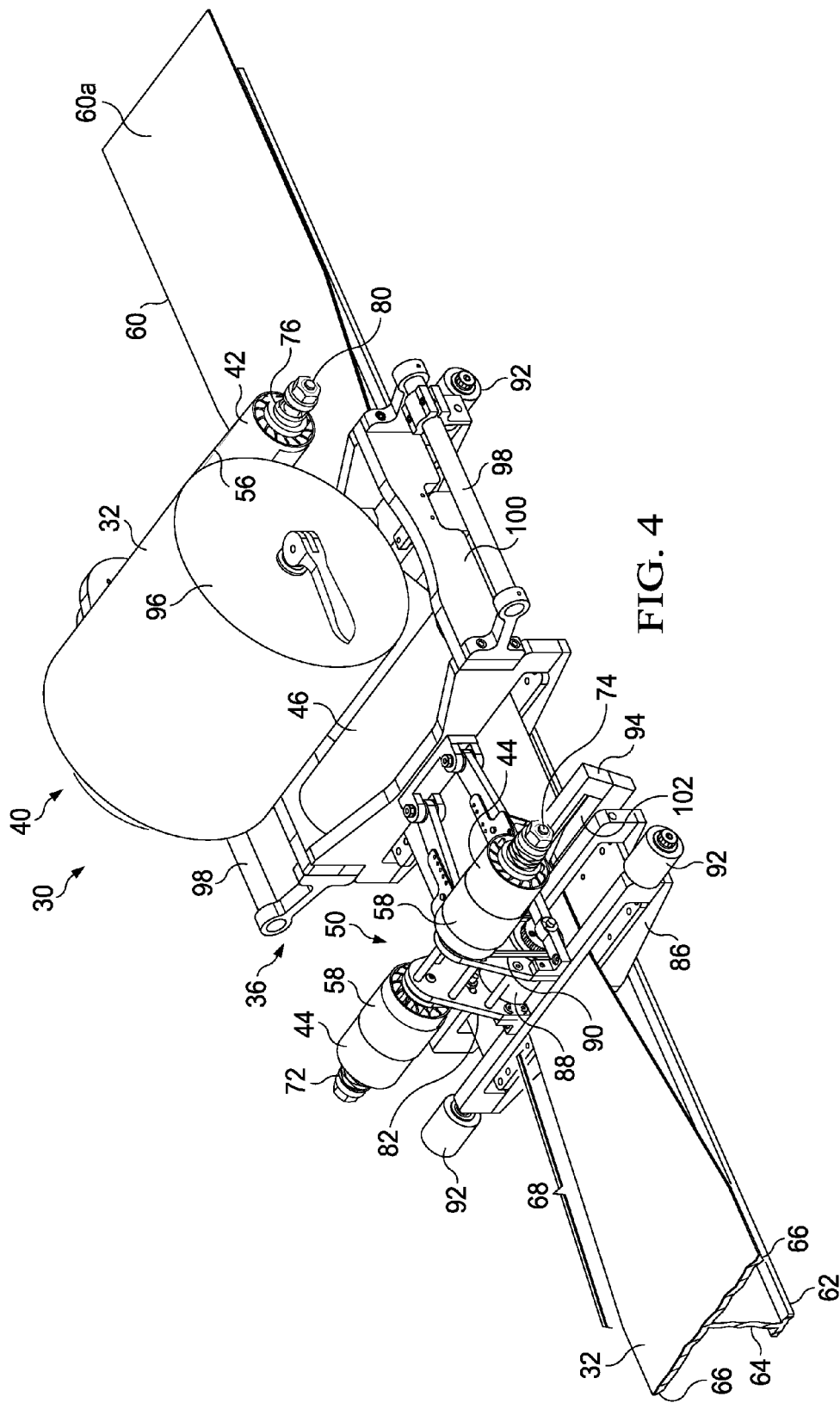

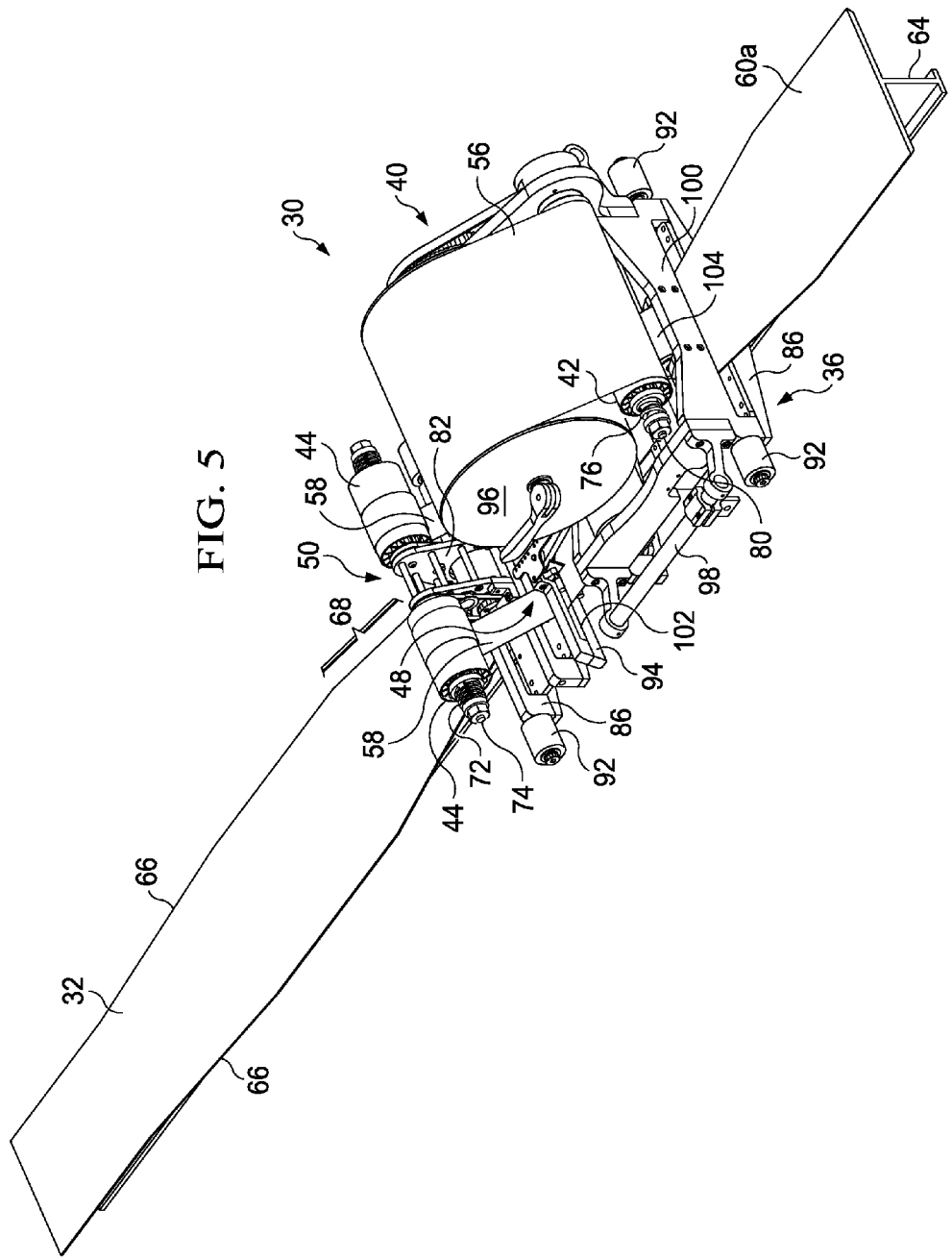

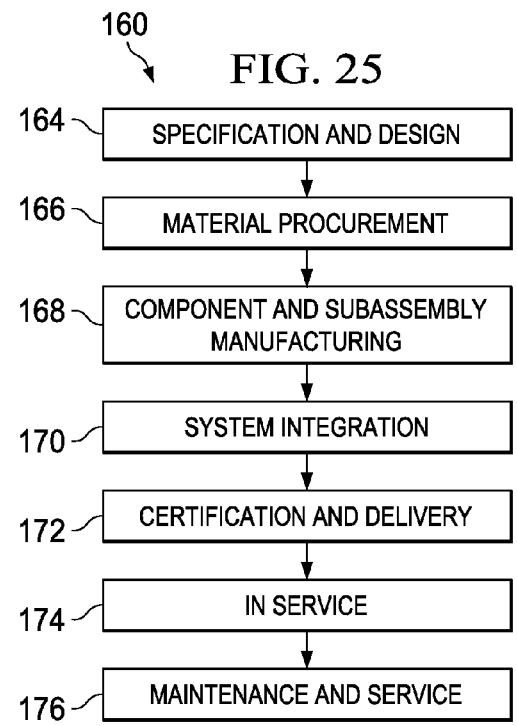
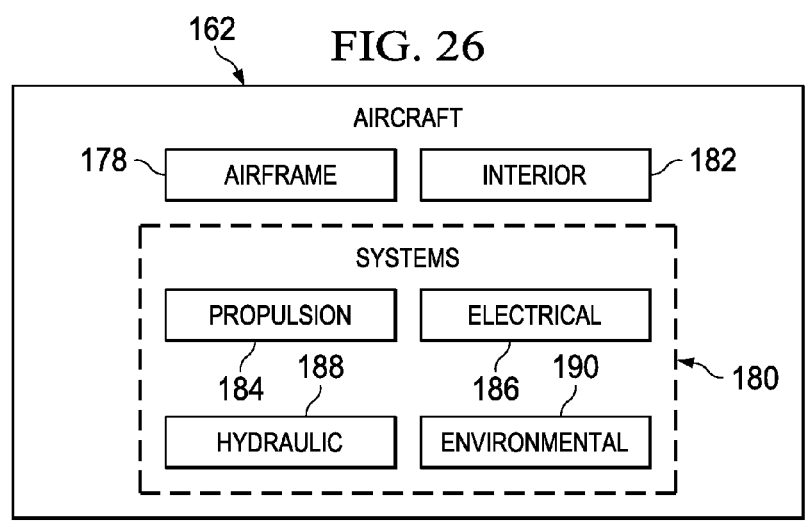

METHOD AND APPARATUS FOR APPLYING FILM MATERIAL TO ELONGATE MEMBERS

BACKGROUND INFORMATION

1. Field

The Present Disclosure Generally Relates to the application of film over a substrate, and deals more particularly with a method and apparatus for applying and trimming a film material along a surface of an elongate structural member, such as a composite stringer.

2. Background

Composite and other structures may be bonded together using a structural film adhesive material which may include a carrier such as a scrim for controlling bondline thickness. For example, in the aircraft industry, a composite stringer may be joined to another composite part such as a skin by co-bonding, or in a secondary bonding operation using a structural film adhesive material that is applied over the surface of a flange on the stringer. The stringer flange with the applied film adhesive is placed against the skin and the film adhesive is cured using thermal or other techniques.

Preparing long composite structural members such as aircraft stringers for an adhesive bonding operation is a multi-stage process that is currently time consuming and labor intensive. A film adhesive material is manually rolled out to the length of the stringer, which may be 90 feet or more in the case of aircraft applications, and a protective poly backer must then be removed from the film. The entire length of the film material is then flipped over by a team of workers in order to place the backside of the film adhesive on a base flange of the stringer. Workers then manually trim excess film material away from the edges of the base flange. This hand trimming technique may be tedious, time-consuming and presents the risk of damage to edges of the base flange, particularly where the flange is beveled. During hand trimming, foreign object debris may be produced which, if adhered to the stringer, may affect the desirability of the bond. After trimming, the film material is smoothed by hand following which the stringer is flipped over and vacuum bag processed in order to compact the film material against the stringer base flange.

Accordingly, there is a need for a method and apparatus for applying film material to long structural members that reduce dependence on manual labor, and which improve process flow time. There is also a need for a method and apparatus for applying film material that provide rapid trimming of excess material to match structural details, and which eliminate the need for vacuum bag compaction.

SUMMARY

The disclosed embodiments provide a method and apparatus for applying film material in roll form over surfaces of long structural members such as composite stringers, spars, beams and doublers, to name only a few. A film material applicator is used to place, trim, remove a backing and compact film material in a single pass along the length of the structural member. The film material applicator and related application method may reduce process flow time, as well as recurring costs including labor and materials. Improved material utilization may be achieved, along with improved film material uniformity and fit-up. Potential damage to edges of the structural member during trimming of the film material is reduced or eliminated. The film applicator avoids the use of on-board motors and automated controls, and is therefore relatively simple, reliable and easy-to-use. The film applicator can be easily set up and manually operated by production workers.

According to one disclosed embodiment, apparatus is provided for applying film to a surface of an elongate member. The apparatus comprises a carriage, rollers adapted to mount the carriage for movement along the elongate member, and a supply of film material on the carriage for dispensing film. The apparatus further comprises a compaction roller on the carriage for compacting the film against the surface of the elongate member, and a film cutter assembly for trimming both edges of the film material as the carriage moves along the elongate member. The elongate member may include a top, a bottom and sides, and the rollers engage the top, bottom and sides of the elongate member. The rollers may include fore and aft rollers mounted on the carriage for gripping the sides of the elongate member, and fore and aft traction tires mounted on the carriage for engaging the top of the elongate member. The film includes a backer and the apparatus further comprises a backer take-up reel mounted on the carriage for taking up and accumulating the backer as the film is being dispensed from the supply of film, and a backer take-up drive assembly for driving the backer take-up reel to rotate as the carriage moves along the elongate member. The supply of film includes a film material feed roll mounted for rotation on the carriage, and the backer take-up drive assembly is driven by rotation of the film feed roll. The film cutter assembly may include a pair of laterally spaced arms pivotally attached to the carriage, and a pair of cutter knives respectively attached to the arms for cutting edges of the film material as the carriage moves along the elongate member. The film cutter assembly further includes a guide slot for guiding the film material, and follower surfaces adapted to slidably engage edges of the elongated member. The follower surfaces are coupled with the cutter knives and guide the cutter knives to cut the film material along edges of the elongated member.

According to another embodiment, apparatus is provided for applying film material to a flange surface of an elongate composite stringer. The apparatus comprises a carriage adapted to be mounted on and movable along the elongate composite stringer, a compaction roller mounted on the carriage for compacting film material against the flange surface as the carriage moves along the stringer and a material feed roll assembly on the carriage adapted to hold a quantity of film material and to dispense the film material to the compaction roller. The apparatus may further comprise a take-up reel on the carriage adapted for taking up a backing on the film material as the film material is being dispensed to the compaction roller, a heater on the carriage for heating the flange surface as the carriage moves along the composite stringer, and a film trimmer for trimming edges of the film material to match the contour of the composite stringer after the film material has been compacted against the flange surface. The carriage includes an upper frame adapted to be positioned above the flange surface and on which the compaction roller, film material feed roll assembly, take-up reel, heater, and film trimmer are mounted, and a lower frame adapted to be disposed beneath the flange surface. The apparatus may further comprise rollers on the lower frame for gripping the carriage against the elongate composite stringer, a backer take-up reel mounted on the upper frame adapted for taking up a backer on the film material, and a drive coupled between the film feed roll assembly and the backer take-up reel for driving rotation of the backer take-up reel. The film trimmer comprises a pair of followers adapted to engage and follow opposite edges of the flange surface, and a pair of cutter knives respectively pivotally mounted on the followers for cutting the film material along the opposite edges of the flange surface.

According to a further embodiment, a method is provided of applying film material to a surface of an elongate member. The method comprises moving a carriage along the surface of the elongate member, dispensing film from a material supply on the carriage, compacting the film against the surface of the elongate member using a compaction roller on the carriage as the carriage moves along the surface of the elongate member, and trimming edges of the film that have been compacted against the surface of the elongate member, including using the carriage to move at least one cutter through the film as the carriage moves along the surface of elongate member. The dispensing, compacting and trimming are performed in a single pass as the carriage moves along a surface of the elongate member. The method may further comprise removing a backer from the film being dispensed, and accumulating the backer on a backer take-up reel on the carriage. Trimming the edges of the film includes drawing a pair of cutting knives through the film as the carriage moves along a surface of the elongate member, following the edges of the elongate member, and moving the cutting knives to follow the edges of the surface of the elongate member.

According to still another embodiment, a method is provided of applying film material over the length of a flange surface on a composite stringer. The method comprises placing a film material applicator on the flange surface, moving the film material applicator along the length of the composite stringer, using the film material applicator to dispense and apply film material to the flange surface as the film material applicator moves along the length of the composite stringer, and using the film material applicator to trim edges of the film material to substantially match edges of the flange surface as the film material applicator moves along the length of the composite stringer. Placing the film material applicator on the flange surface includes gripping the film material applicator against a top, bottom and sides of the composite stringer. Using the film material applicator to trim edges of the film material includes following edges of the flange surface, moving cutting knives to follow the edges of the flange surface, and using the cutting knives to cut edges of the film material along the edges of the flange surface. The method may further comprise taking up scrap film on a reel on the carriage produced by cutting the edges of the film material. The method may also include taking up a film material backing on a reel on the carriage. The reels may be allowed to slip during take up of the scrap film and the film material backing using slip clutches.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 1 is an illustration of a functional block diagram of a film material applicator according to the disclosed embodiments.

FIG. 2 is an illustration of a perspective view of a stringer having a base flange surface to which film material is applied using the film material applicator shown in FIG. 1.

FIG. 3 is an illustration of an end view of the stringer shown in FIG. 2.

FIG. 4 is an illustration of an upper perspective view showing one side of the film material applicator in the process of placing film on a stringer flange.

FIG. 5 is an illustration similar to FIG. 4 but showing the opposite side of the film material applicator.

FIG. 25 is an illustration of a flow diagram of aircraft production and service methodology.

FIG. 26 is illustration of a block diagram of an aircraft.

DETAILED DESCRIPTION

Figure 6:
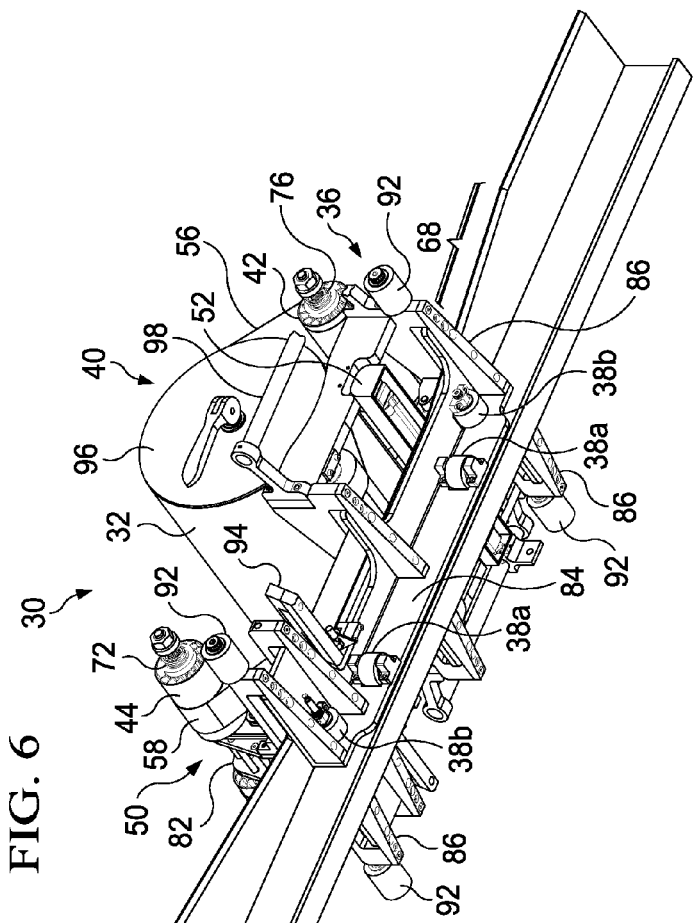
FIG. 6 is an illustration of a lower perspective view showing one side of the film material applicator.
Figure 7:
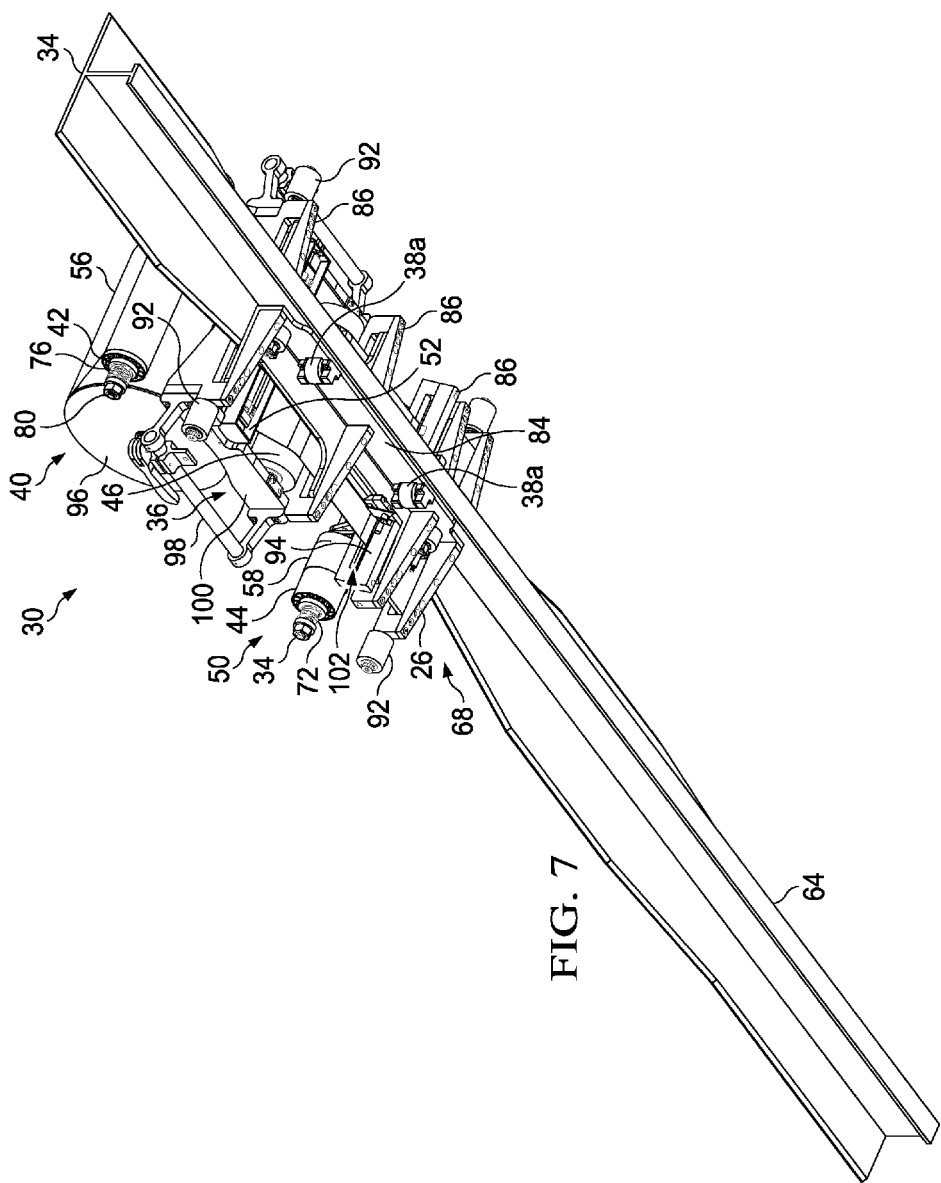
FIG. 7 is an illustration similar to FIG. 6 but showing the opposite side of the film material applicator.
Figure 8:
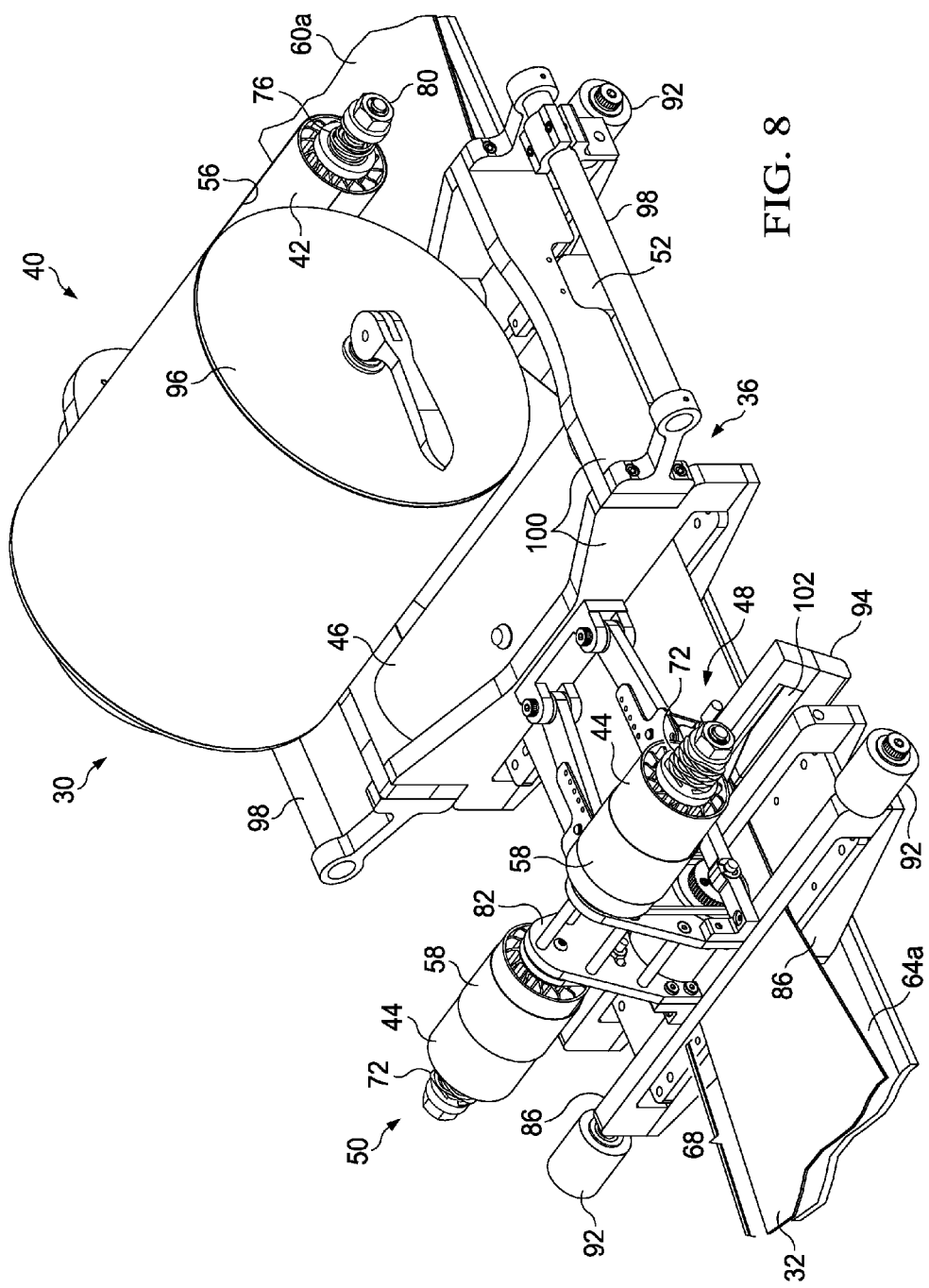
FIGS. 8-11 are illustrations respectively similar to FIGS. 4-7, but enlarged to show additional details of the film material applicator.
Figure 9:
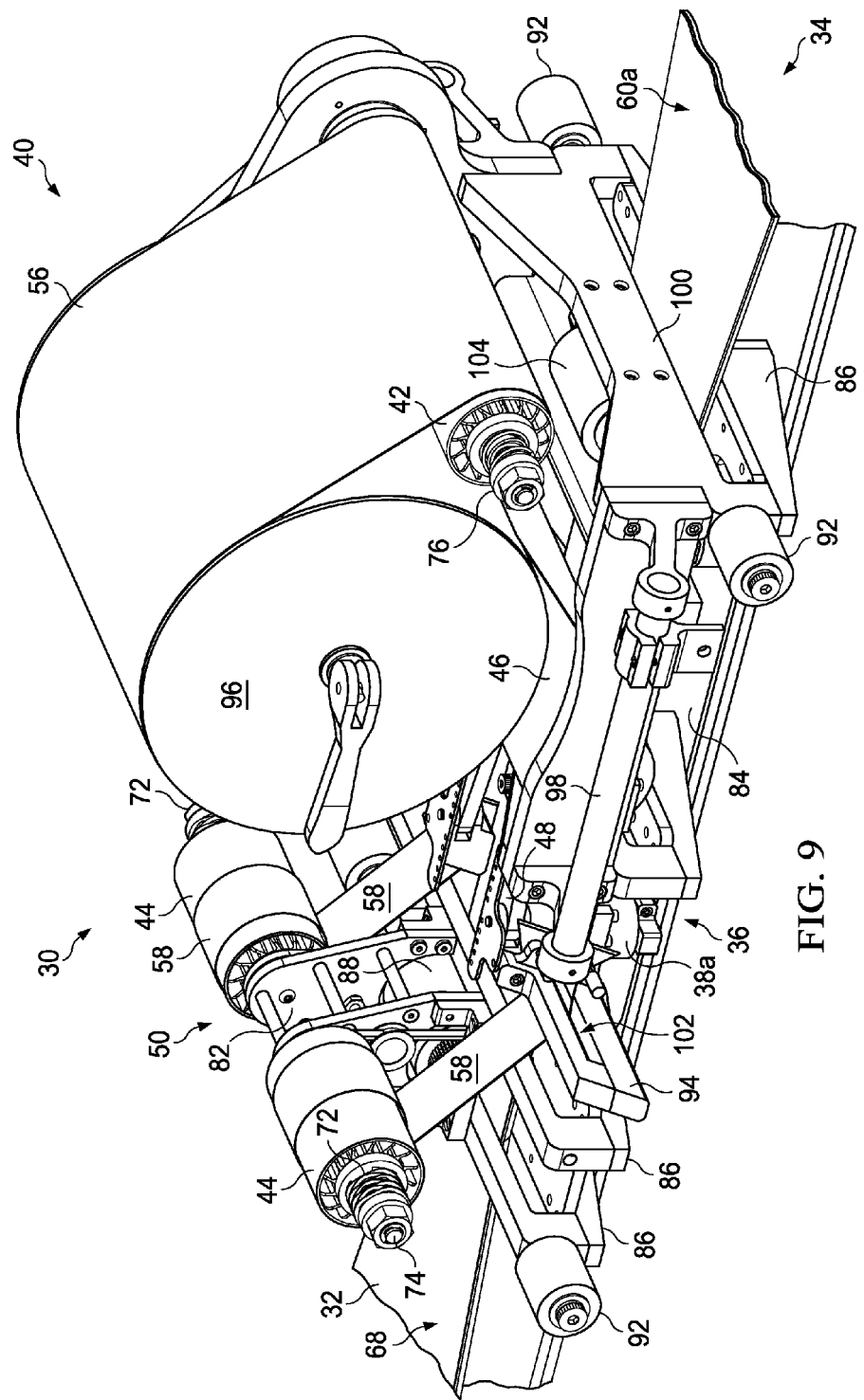
Figure 10:
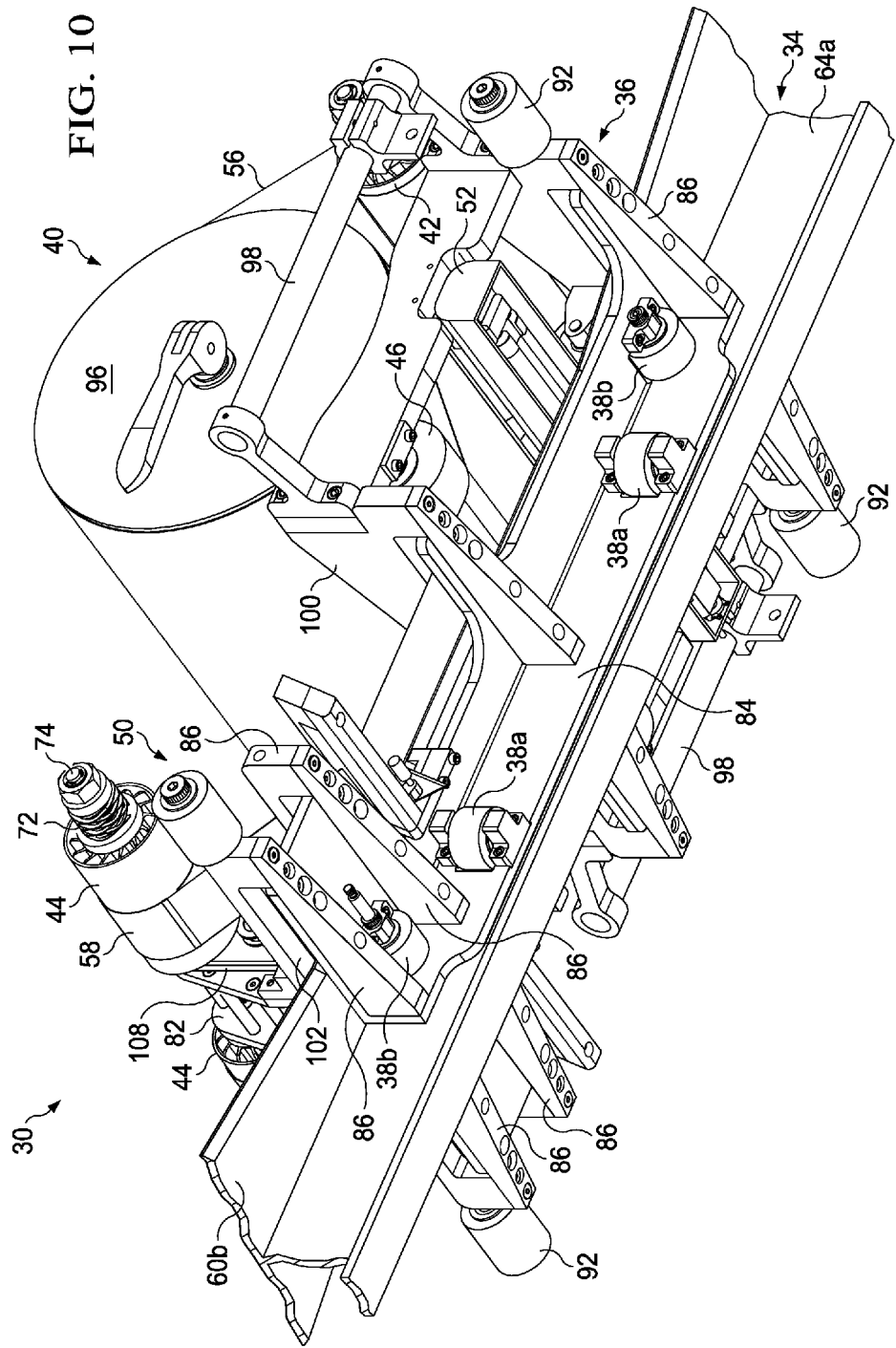
Figure 11:
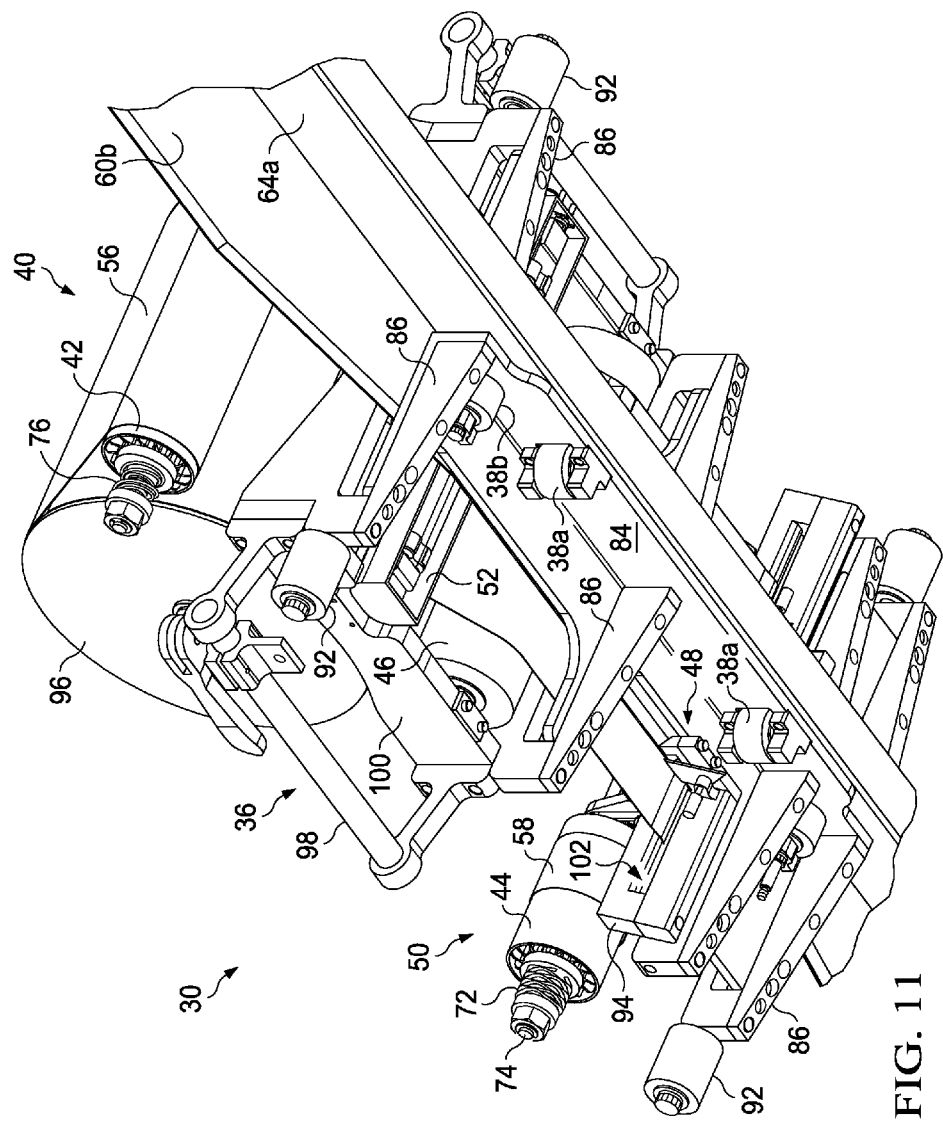
Figure 12:
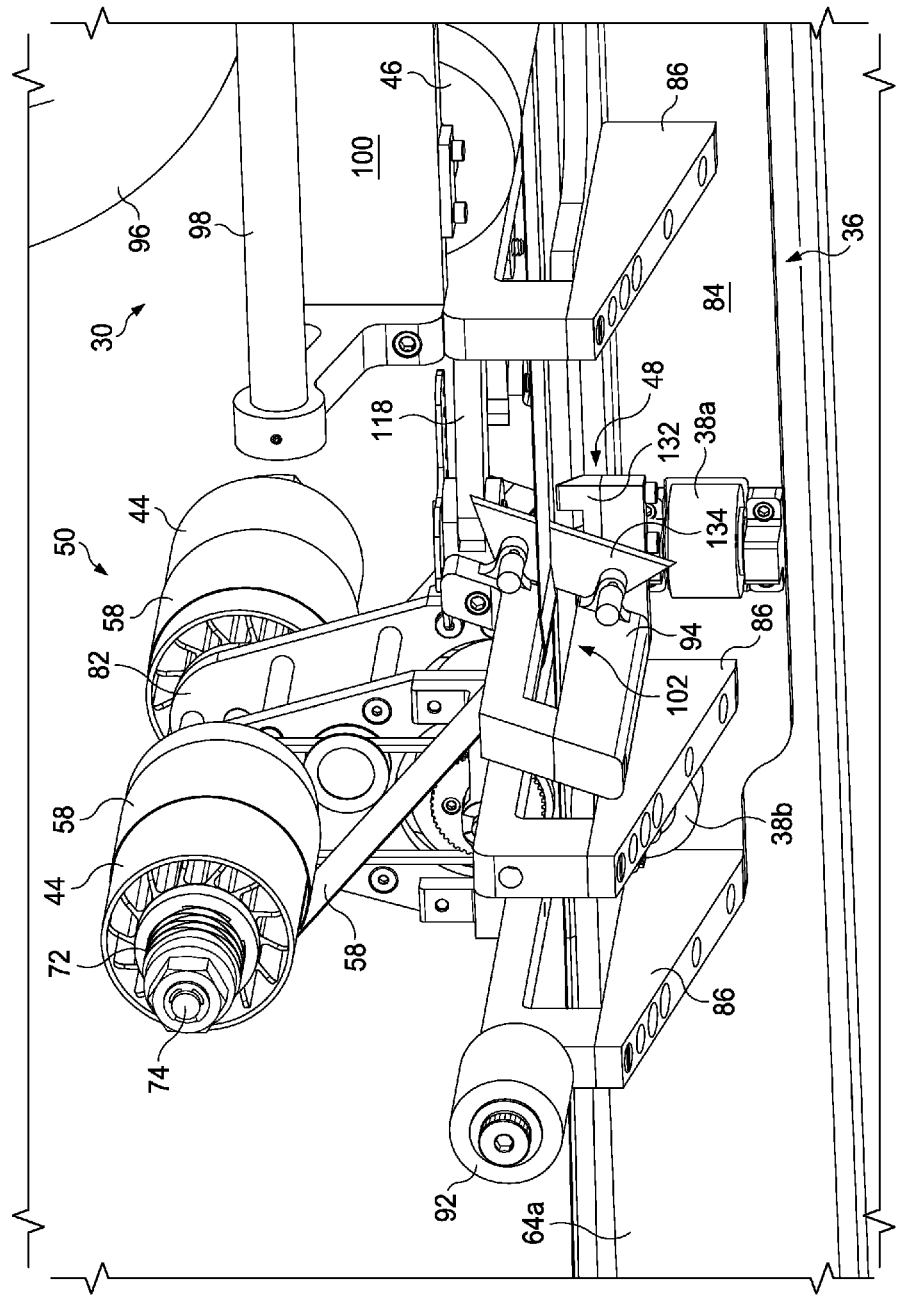
FIG. 12 is an illustration of a perspective view of the rear half of the film material applicator, showing details of the film cutter assembly and film scrap take-up assembly.
Figure 13:
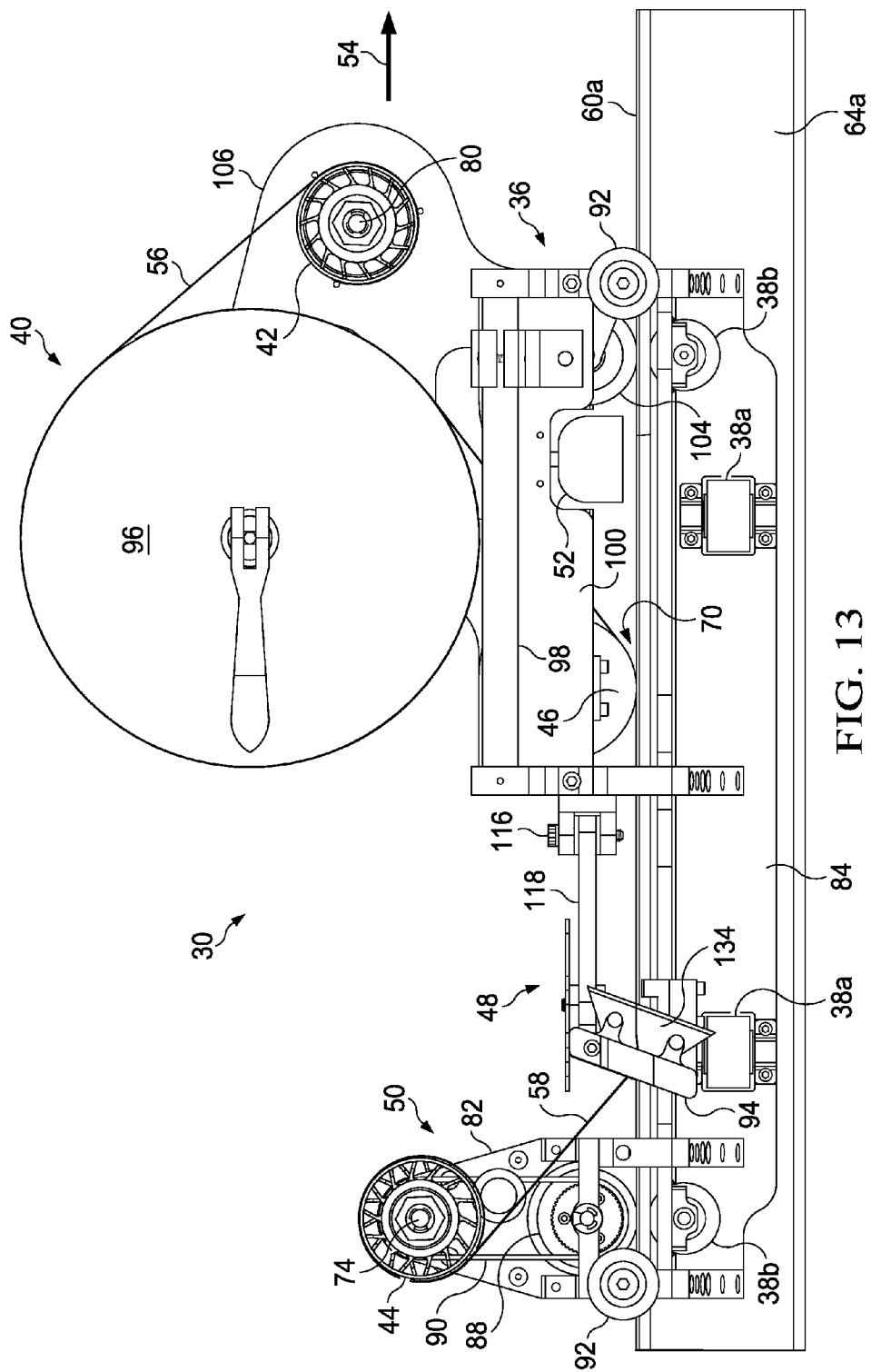
FIG. 13 is an illustration of an elevational view of one side of the film material applicator.

Referring first to FIG. 1, the disclosed embodiments relate to an apparatus 30 for dispensing, placing, compacting and trimming film material 32 on the surface 60a of elongate structural member 34. For simplicity of description the apparatus 30 will be hereinafter referred to as a film applicator 30, and the film material 32 may be referred to as film 32, material or film material 32. In the illustrated example discussed below in more detail, the structural member 34 is a composite stringer, however it is to be understood that the film applicator 30 may be employed to apply film material 32 to the surface of any long, relatively narrow members such as, without limitation, spars, beams, doublers, etc. The film material 32 may comprise any relatively thin, flexible material that is required to be applied to the elongate structural member 34, such as without limitation, an adhesive.

The film applicator 30 comprises several functional components discussed below that are mounted on a carriage 36 for rolling movement along the structural member 34 by means of pinch rollers 38. The pinch rollers engage and grip the top, bottom and sides of the structural member 34 in order to both guide and index the film applicator 30 as the film applicator 30 is moved along the length of the structural member 34 in the direction of travel or placement 54.

The film applicator 30 includes a film feed roll assembly 40 containing a supply of the film material 32 which is dispensed and fed to a film compaction roller 46. The film compaction roller 46 compacts the film material 32 against the surface 60a as the carriage 36 moves along the length of the structural member 34. Optionally, a suitable heater 52 such as an infrared heater mounted on the carriage 36 may be used to heat 52a the surface 60a immediately before the film 32 is placed and compacted in order to improve adhesion of the film material 32 to the surface 60a. As the film 32 is being dispensed, a backer 56, typically a poly film material protectively covering the film material 32, is drawn away from the film material 32 and is fed to a backer take-up reel 42. A film cutter assembly 48 mounted on the carriage 36 aft of the film compaction roller 46 trims the outer edges of the film material 32 to substantially match the edges of the structural member 34. The film scrap 58 resulting from this trimming operation is accumulated on a film scrap take-up assembly 50 which is also mounted on the carriage 36.

Referring now to FIGS. 2 and 3, the structural member 34 may comprise a composite laminate stringer 34, which is shown in an inverted position in Figures. The stringer 34 includes a base flange 60 and a top flange 62 connected by a central web 64, forming a generally "T"-shaped cross-section (in the inverted position). The base flange 60 includes a flange surface 60a extending the entire length of the stringer 34 and has a width "W". In the example shown in FIGS. 2 and 3, the width "W" is substantially constant along the entire length of the stringer 34, however in other examples the width "W" of the flange surface 60a may vary. Also, although the illustrated flange surface 60a is substantially flat, in other examples, the flange surface 60a may be curved, and/or twisted along its length. Opposite longitudinal edges 66 of the base flange 60 may be beveled. In order to bond the base flange 60 to another structure such as, for example and without limitation, a skin (not shown), a film adhesive is applied over the base flange surface 60a using the film applicator 30 shown in FIG. 1 and described in more detail below.

Attention is now directed to FIGS. 4-15 which illustrate one embodiment of the film applicator 30 which may be employed to place film material 32 on the flange surface 60a of a stringer 34. In this example, the flange surface 60a includes an inward taper 68 (see FIGS. 4 and 5) along its opposite beveled edges 66. As shown in FIGS. 9, 10, 13 and 14, the film applicator 30 includes a carriage 36 comprising a lower frame 84 and an upper frame 100 which are fixedly attached to each other by brackets 86. Handlebars 98 on opposite sides of the upper frame 100 are adapted to be grasped by a worker for handling and transporting the film applicator 30, and for manually moving it along the stringer 34 during the film application process. Outrigger wheels 92 attached to the outer ends of brackets 86 may be used to support and guide the film applicator 30 along a fixture (not shown) that may be used to hold the stringer 34 in a fixed, inverted position during the film placement process.

A first set of longitudinally spaced pinch rollers 38a (FIGS. 6 and 7) mounted on the lower frame 84 engage opposite sides 64a of the web 64 (see FIG. 3), thereby laterally indexing the carriage 36 on the stringer 34. The pinch rollers 38a may be formed of any suitable material such as, without limitation, a synthetic rubber, and may include be spring-loaded inwardly against the sides 64a of the web 64. A second set of longitudinally spaced pinch rollers 38b (see FIGS. 10 and 13) similar in construction to pinch rollers 38a, are also mounted on the lower frame 84, and bear upwardly against lower base flange surfaces 60b (see FIG. 3) of the base flange 60. Pinch rollers 38b may be spring-loaded upwardly against the lower base flange surfaces 60b. Pinch rollers 38b, in combination with other components discussed below, vertically index the carriage 36 and grip the film applicator 30 onto the stringer 34. The pinch rollers 38a, 38b effectively guide and allow the carriage 36 to roll along surfaces 64a, 64b (FIG. 3) of the stringer 34.

The film feed roll assembly 40 broadly comprises a removable feed roll 96 on which a quantity of the film material 32 may be stored. A backer take-up reel 42 takes up and accumulates a protective backer 56 on the film material 32 as the film material 32 is drawn from the film feed roll 40 assembly. The film material 32 is fed into a nip 70 (FIGS. 13 and 14) between the compaction roller 46 and the flange surface 60a as the carriage 36 moves along the stringer 34. Although not shown in the drawings, the film material 32 may include a second backer that is remains adhered to the film material 32 as it is compacted against the flange surface 60a.

Figure 14:
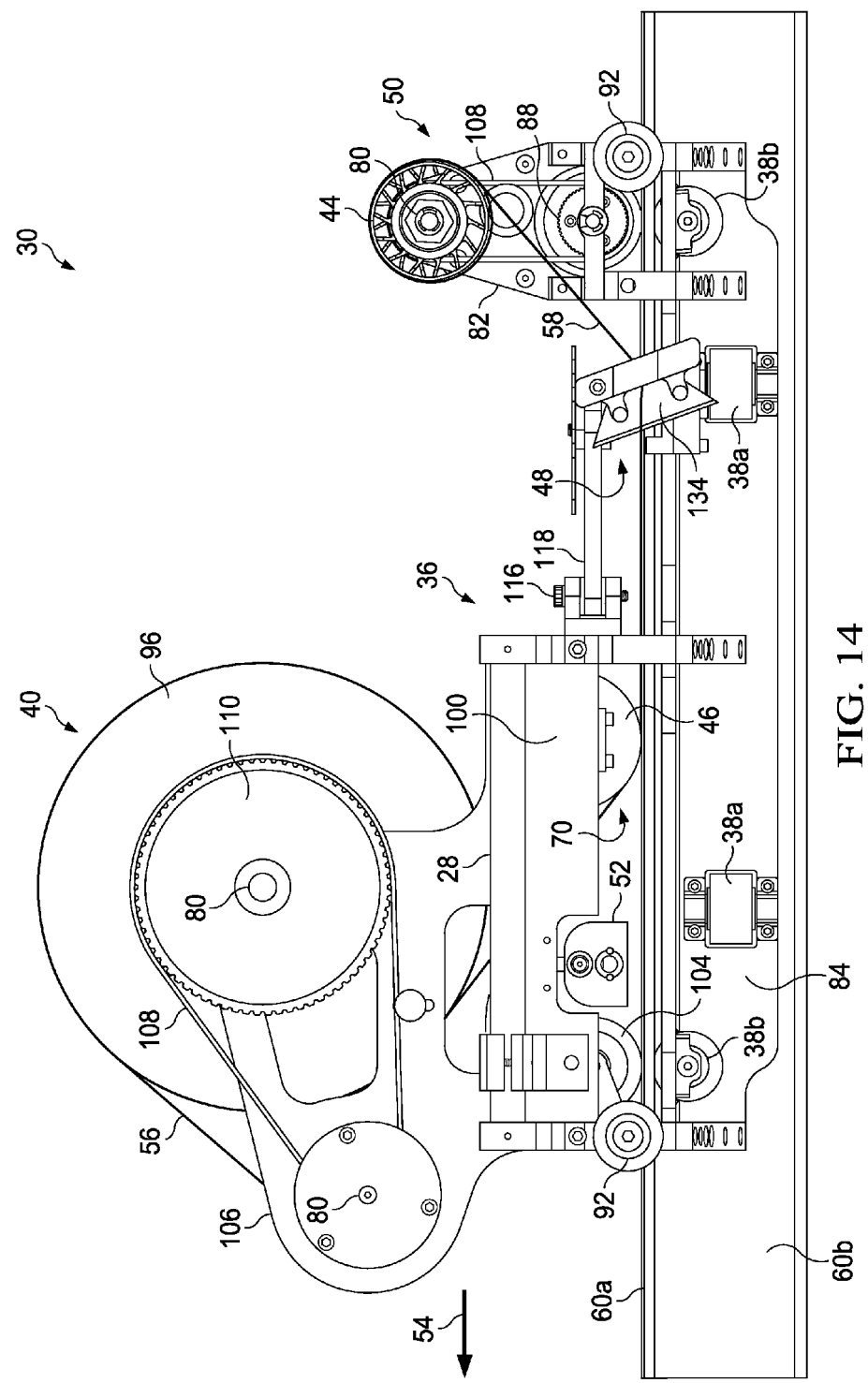
FIG. 14 is an illustration of an elevational view of the other side of the film material applicator.
Figure 15:
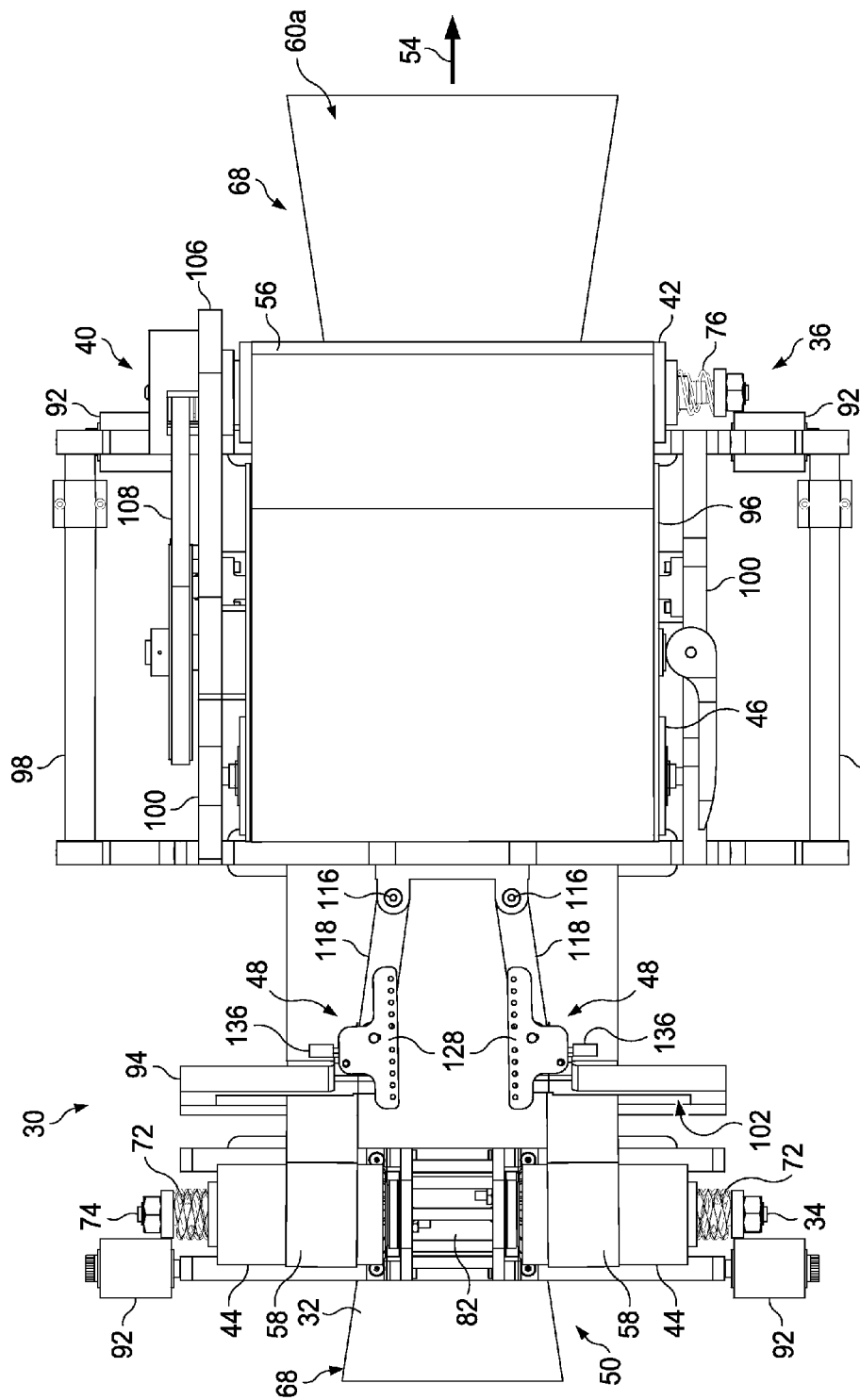
FIG. 15 is an illustration of a top plan view of the film material applicator.
Figure 16:
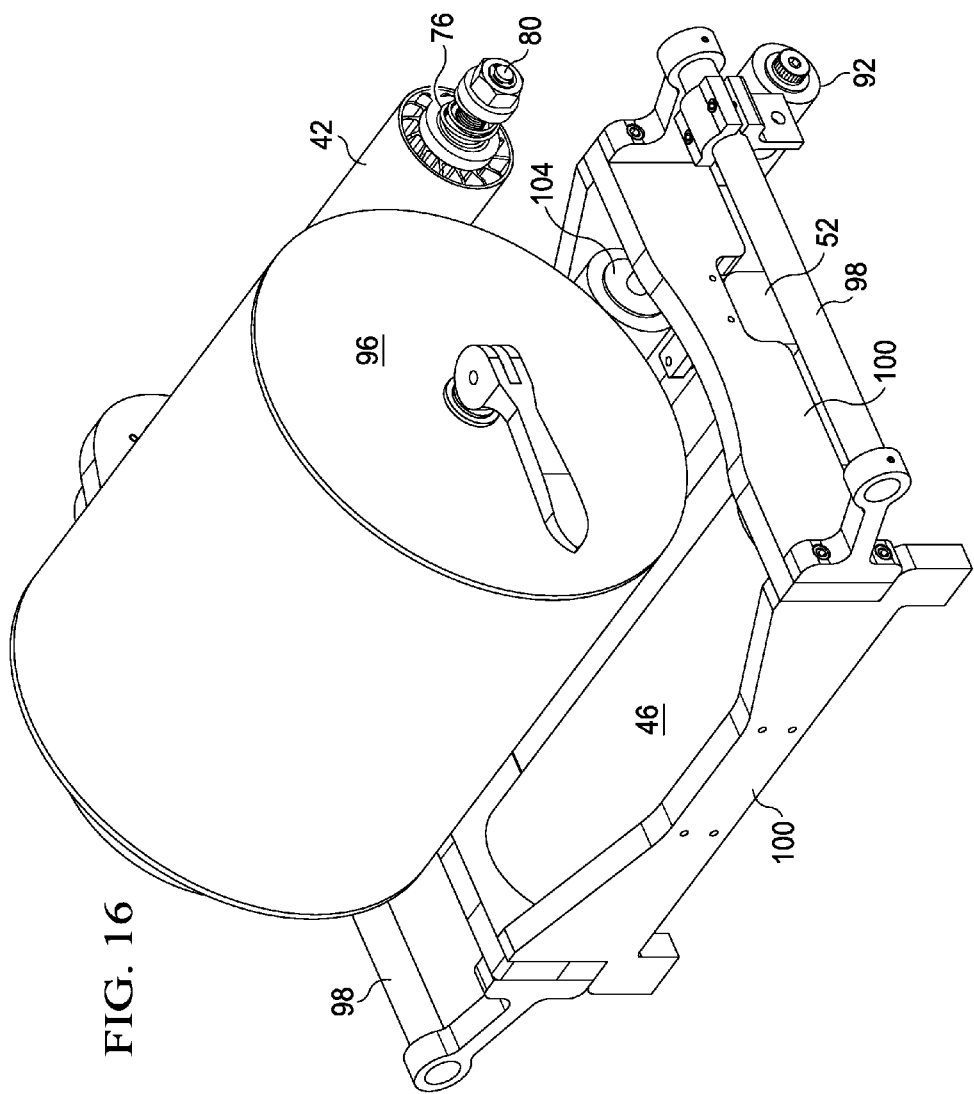
FIG. 16 is an illustration of a perspective view of one side of the film feed roll assembly.
Figure 17:
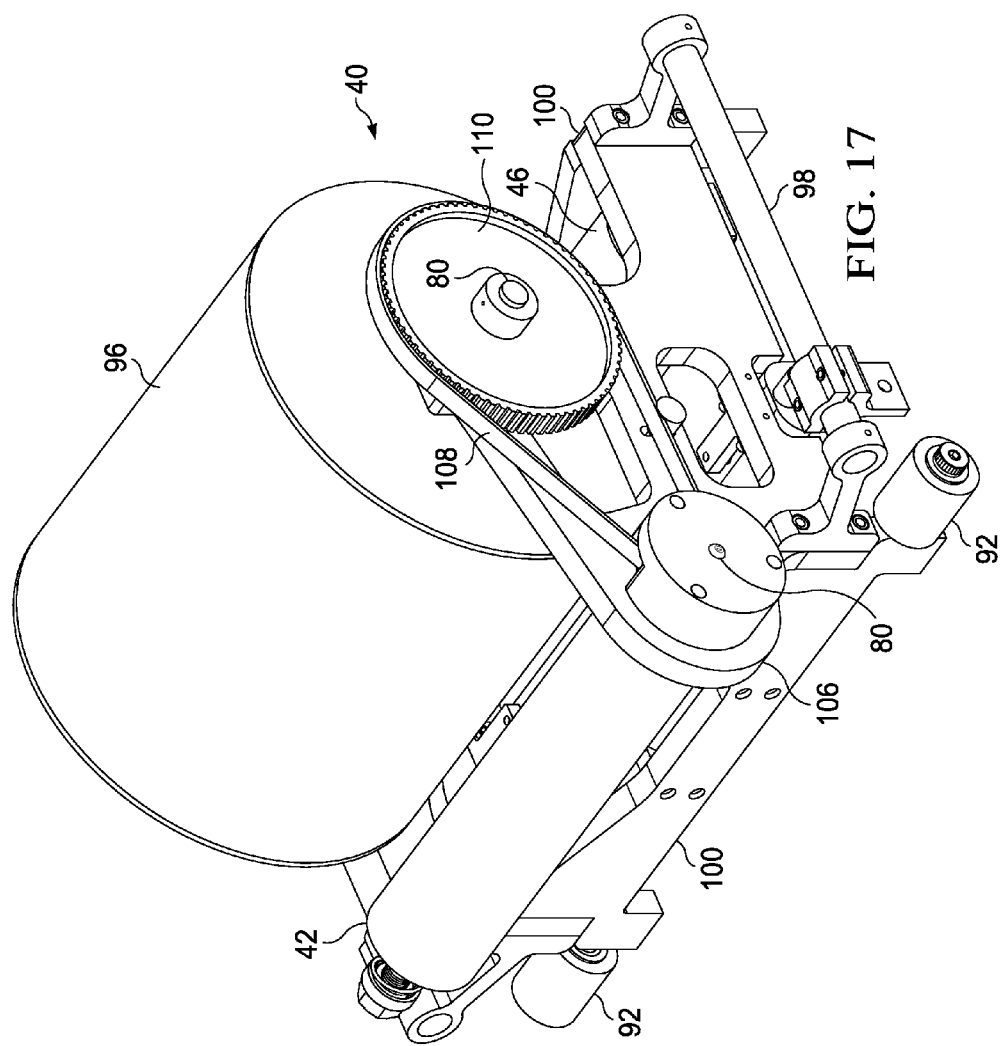
FIG. 17 is an illustration of a perspective view of the other side of the film feed roll assembly.
Figure 18:
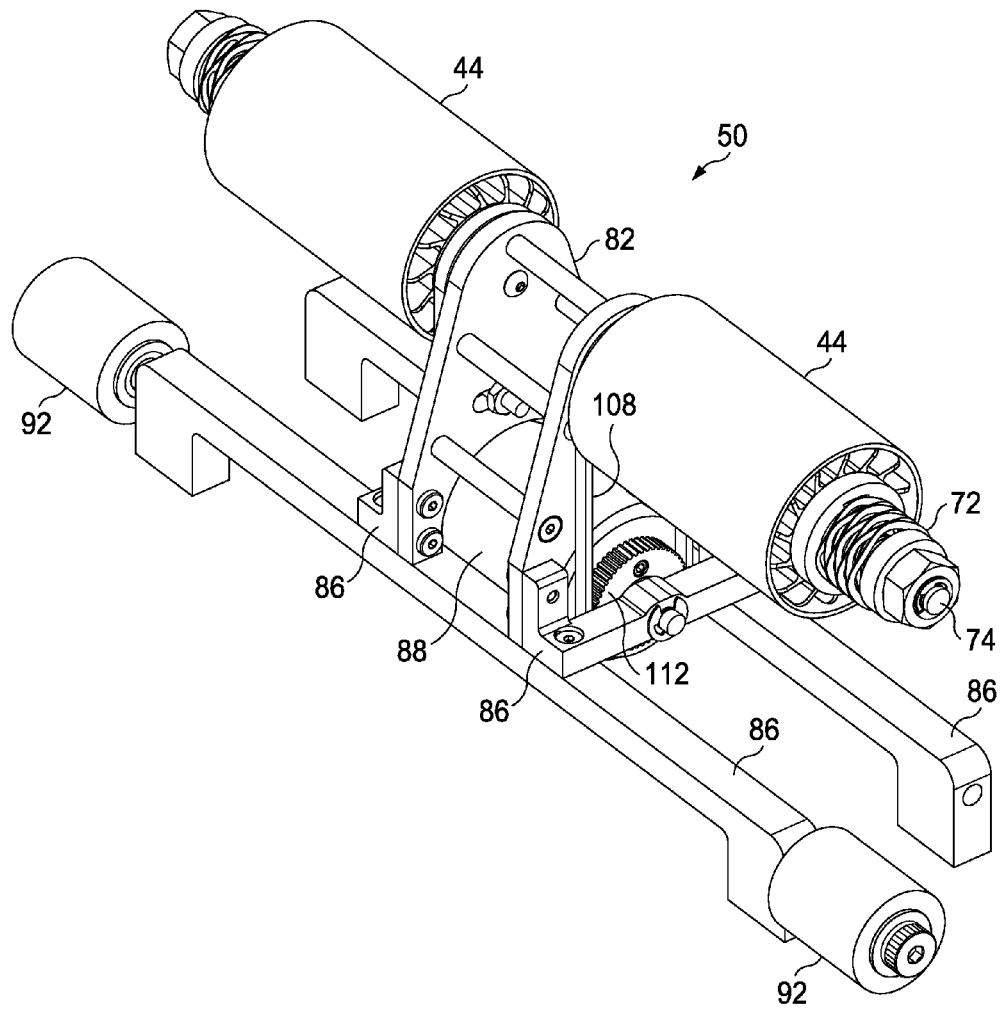
FIG. 18 is an illustration of a perspective view of the film scrap take-up assembly.

Referring now particularly to FIGS. 13-17, the backer take-up reel 42 is mounted on a shaft 80 by a spring loaded slip clutch 76 which allows the take-up reel 42 to slip relative to the shaft 80 under certain conditions, discussed later. As best seen in FIGS. 14 and 17, the shaft 80 along with the feed roll 96 are journaled for rotation on a support bracket 106 mounted on the upper frame 100. The shaft 80 is driven by a take-up reel drive belt 108 coupled with a toothed pulley 110 attached to and driven by rotation of the feed roll 96, so that normally, the backer take-up reel 42 rotates in synchronization with rotation of the feed roll 96 as the film 32 is drawn from the feed roll 96.

Referring now again to FIGS. 4-14, the compaction roller 46 is journaled for rotation on the upper frame 100 and is adapted to bear against the flange surface 60a. Film 32 drawn from the feed roll 96 is fed to the nip 70 and then compacted against flange surface 60a by the compaction roller 46 so that the film 32 adheres substantially uniformly to flange surface 60a. Optionally, depending upon the application, suitable a heater 52, which may comprise, without limitation, an infrared heater, is mounted on the upper frame 100, forward of the compaction roller 46 and extends across substantially the entire width of the base flange surface 60a. The heater 52 functions to heat the flange surface 60a in advance of placement of the film material 32 in order to promote adhesion of the film to the surface 60a. Other means of heating the base flange surface 60a immediately in advance of film placement may be possible.

A centrally located front traction tire 104 (FIGS. 5, 9, 13, 14) is journaled for rotation on the upper frame 100, and is positioned above the forward set of the pinch rollers 38b. Spring-loading of the forward set of pinch rollers 38b cause the front traction tire 104 to be drawn down against the base flange surface 60a, effectively "pinching" the base flange 60 between the front traction tire 104 and the forward set of pinch rollers 38b. Similarly the base flange 60 is pinched between the compaction roller 46 and the pinch rollers 38a, 38b.

Referring now to FIGS. 12-15, and 20-22, the film cutter assembly 48 comprises a pair of laterally spaced link arms 118 that are pivotally attached to a mounting bracket 114 by pivot pins 116. The mounting bracket 114 is fixed to the upper frame 100, as best seen in FIGS. 8, and 13-15. Cutter follower arms 94 are pivotally attached to the outer ends of link arms 118 by followers 126 which are attached to link arms 118 by pivot shafts 129. Each of the followers 126 includes a lower guide surface 126a (FIGS. 21 and 22) which bears against, and guides the film 32 as the film 32 passes through the film cutter assembly 48. The lower guide surface 126a may be formed of a low friction material that is resistant to wear, such as, without limitation, a UHMW (ultrahigh molecular weight) polyethylene. Spring plates 128 are fixed to the followers 126, and although not shown in the drawings, a spring may be connected between the spring plates 128 in order to bias the link arms 118 to swing inwardly toward each other.

Each of the cutter follower arms 94 comprises an upper follower arm 122, and a lower follower arm 124 which are spaced apart from each other to form film guide slots 102 into which the outer edges of the film 32 is fed. Each of the upper follower arms 122 is provided with a bearing pad 138 which may be formed of a low friction material that is resistant to wear, such as UHMW polyethylene which is adapted to bear against the outer edges of the film 32 as it passes through the guide slots 102 in the cutter follower arms 94. Guide blocks 132 are attached to the ends of the lower follower arms 124. Pivot blocks 130 are secured to the guide blocks 132 and include upper follower surfaces 130a that are respectively matched in geometry to the contour of the edges 66 of the stringer 34.

In the illustrated example, the upper follower surfaces 130a are beveled to match and engage the beveled edges 66 (FIG. 3) of the stringer 34, beneath the film 32. The upper beveled follower surfaces 130a of the pivot blocks 130 may also include a layer of low friction material that is resistant to wear such as UHMW polyethylene. Cutter knives 134, made of suitable wear resistant material such as carbide, are releasably attached to the cutter follower arms 94 by thumbscrews 136 which hold the knives 134 against the followers 126, pivot blocks 130 and guide blocks 132. Moving the film material applicator 30 along the stringer 34 forces the cutter knives 134 through the film material 32 (including any backer that may be present on the film material 32), thereby trimming the film material 32 to match the width of the base flange surface 60a along the length of the stringer 34. The cutter knives 134 are guided by the beveled follower surfaces 130a on the pivot blocks 130 which are biased into sliding engagement with the beveled edges 66 (FIG. 3) of the stringer 34. Pivotal mounting of the beveled follower surfaces 130a together with the cutter knives 134 allows the cutter knives 134 to individually follow and cut the film material 32 along the opposite beveled edges 66 of the stringer 34, thereby matching the cut width of the film material 32 to the geometry of the top flange 60.

Attention is now directed to FIGS. 12, 13, 15, and 18 which illustrate additional details of the film scrap take-up assembly 50. A pair of scrap take-up rollers 44 are mounted on a shaft by means of a slip clutch 72 that allows the rollers 44 to slip relative to the shaft 74 under certain conditions described later in more detail. The shaft 74 is journaled for rotation on an upright take-up support bracket 82 that is attached to an adjacent pair of the mounting brackets 86. A rear traction tire 88 may be made of any suitable material that achieve traction against the film 32. The rear traction tire 88 is mounted for rotation on a pair of laterally spaced arms 85 (see FIG. 18) attached to brackets 86. A gear wheel 112 attached to the end of the traction tire 88 is connected by a take-up reel drive belt 108 to a gear wheel (not shown) on the shaft 74. Rotation of the traction tire 88 as a result of rolling over the film 32 during the film placement process drives rotation of the take-up rollers 44 through drive belt 108.

In operation, a supply of the film material 32 is loaded onto the feed roll 96 in preparation for covering the flange surface 60 of the stringer 34 with material. As previously discussed, the stringer 34 may be placed in a fixture (not shown) that is designed to hold the stringer 34 in a fixed, inverted position during the film placement process. The film applicator 30 is loaded onto one end of the stringer 34 and the film 32 is drawn down and into the nip 70 (FIG. 13) between the compaction roller 46 and the flange surface 60a, while the backer 56 is separated and partially wrapped around the backer take-up reel 42. In cases where a fixture is used to hold the stringer 34, the outrigger rollers 92 may be placed on the fixture in preparation for rolling the film applicator 30 down the length of the stringer 34.

Workers grasp the handle bars 98 to move the film applicator 30 along the length of the stringer 34. In some embodiments, however, it may be possible to move the film applicator 30 along the stringer 34 using a computer controlled equipment, modifications to incorporate self-powering operation, or other automated equipment (not shown). The heater 52 heats the flange surface 60a immediately ahead of the compaction roller 46. Linear movement of the film applicator 30 draws film material 32 from the film feed roll 96. As the film material 32 is fed to the compaction roller 46, the backer 56 is taken up on the backer take-up reel 42 which is belt driven by the rotation of the feed roll 96. In the event that the feed roll 96 rotates more quickly than the backer take-up reel 42, the slip clutch 76 allows dynamic slipping of the backer take-up reel 42.

Figure 19:
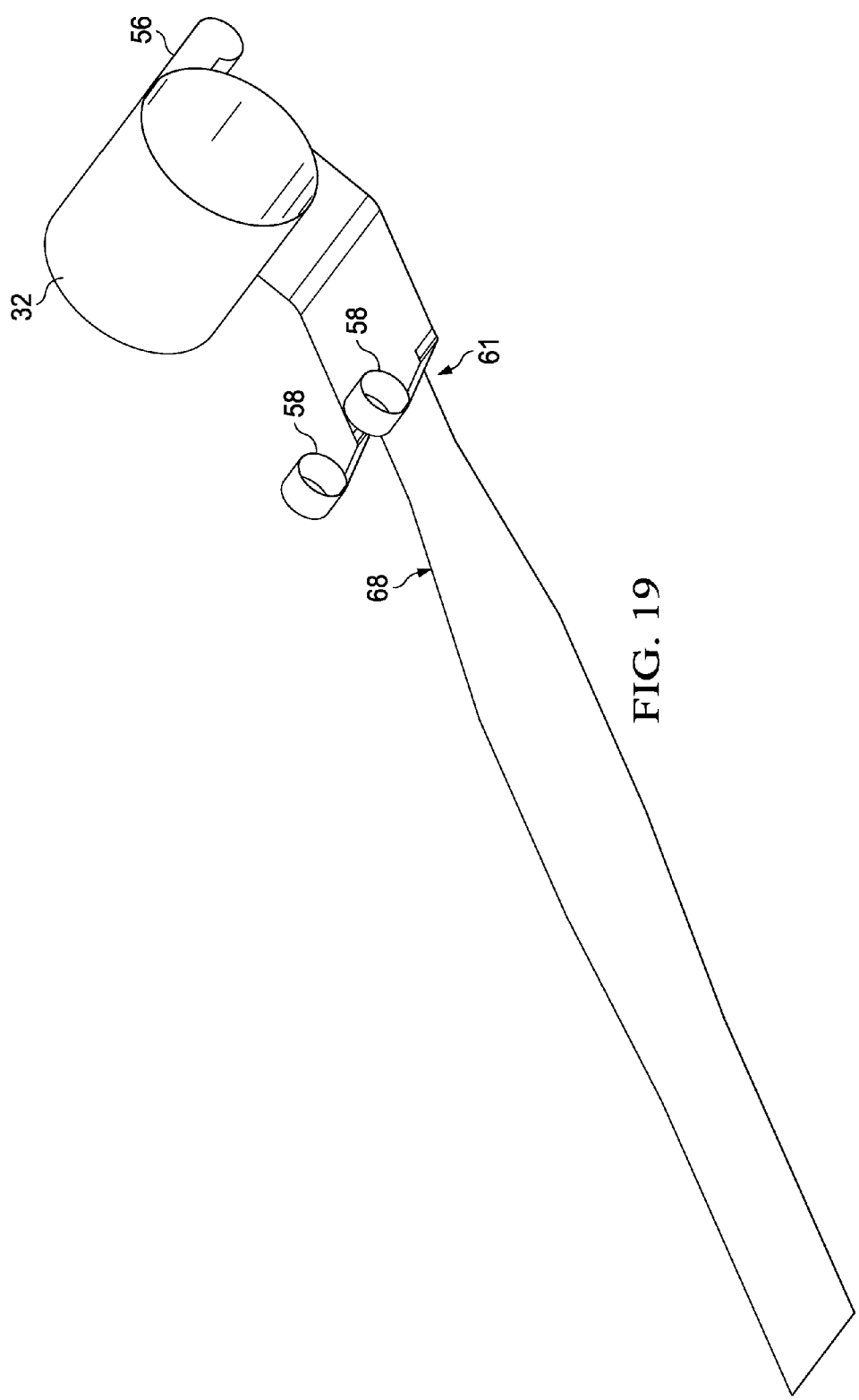
FIG. 19 is an illustration of a perspective view of the film material, diagrammatically showing the portions that are dispensed, placed, trimmed and taken up.
Figure 20:
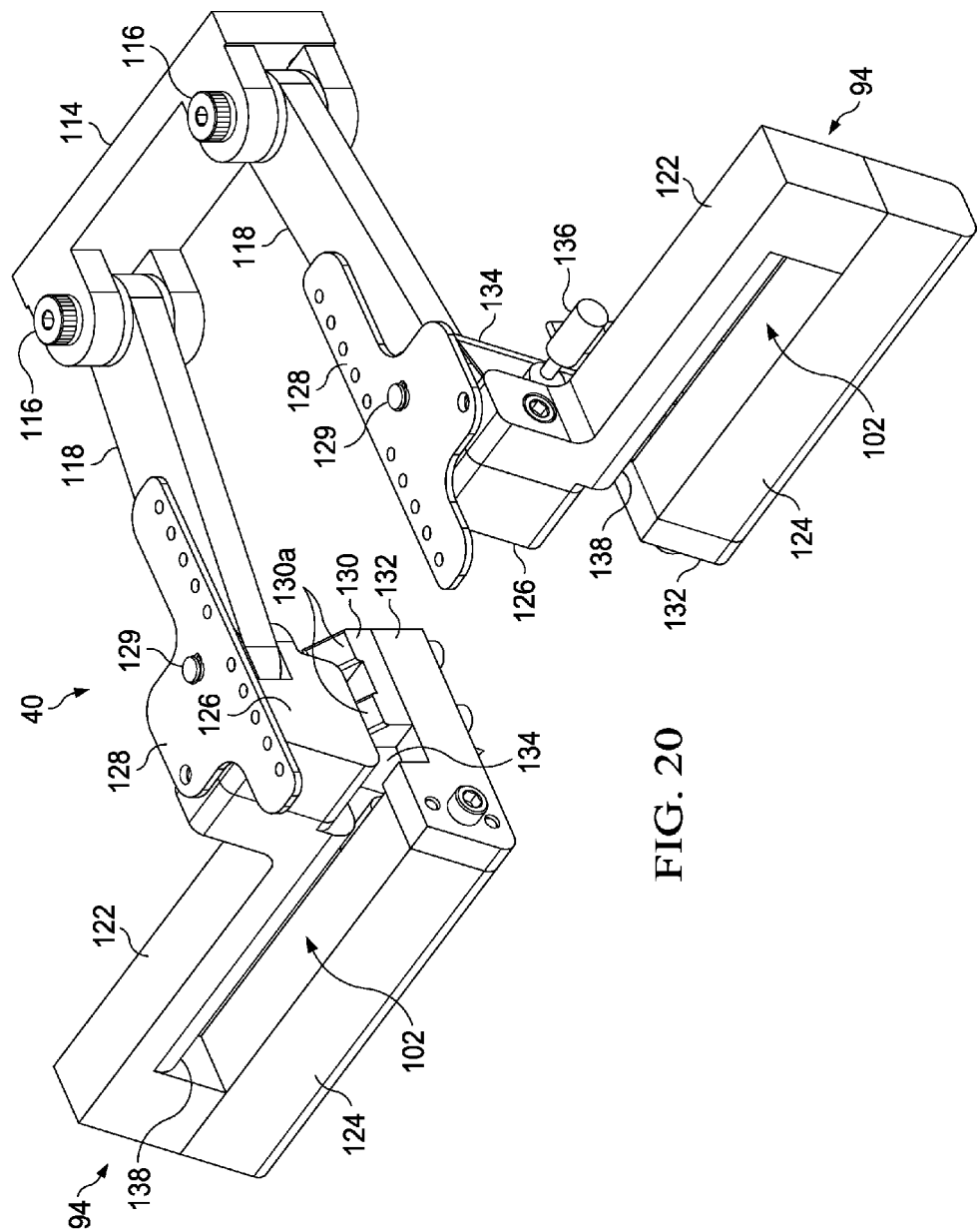
FIG. 20 is an illustration of a front perspective view of the film cutter assembly.
Figure 21:
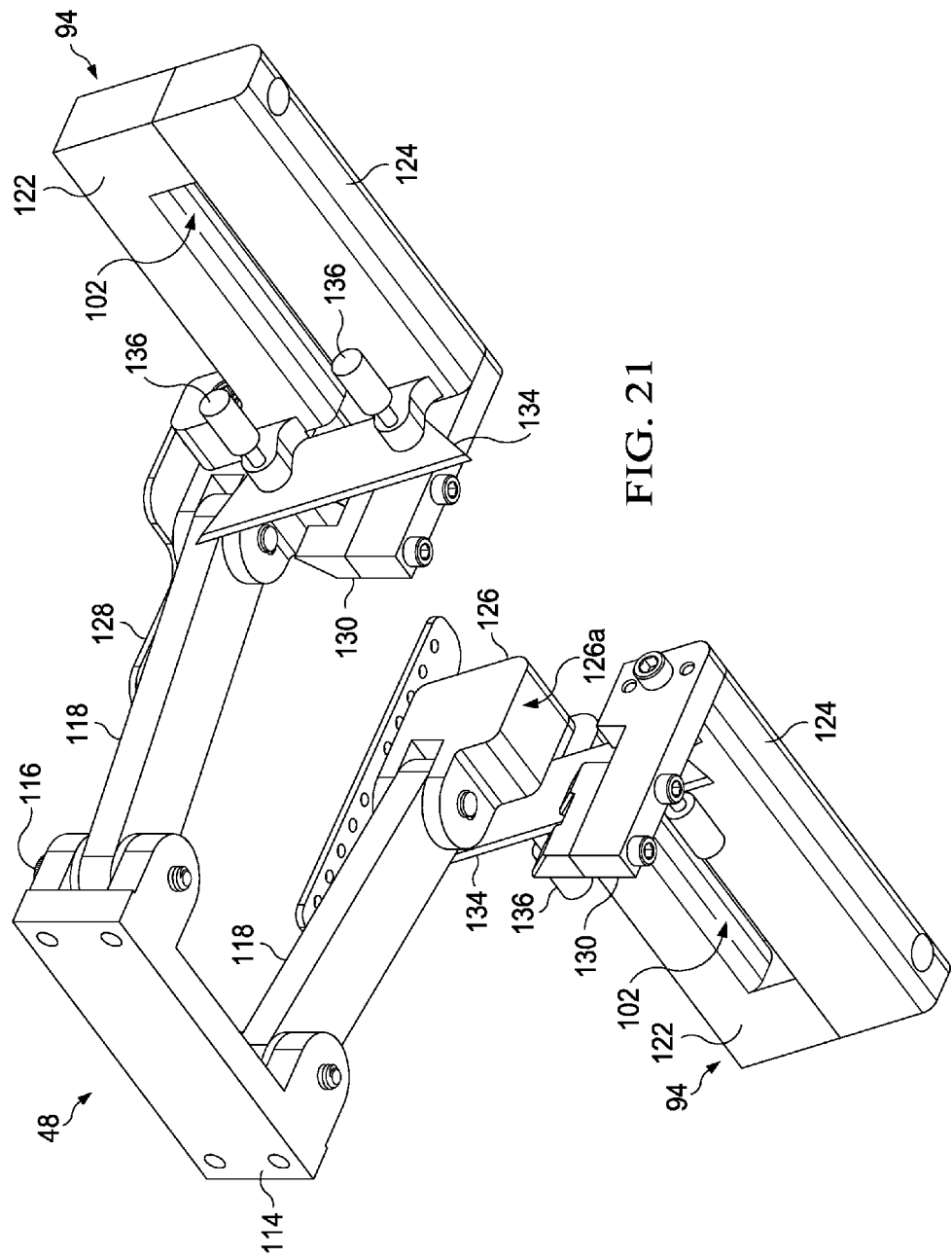
FIG. 21 is an illustration of a rear perspective view of the film cutter assembly.
Figure 22:
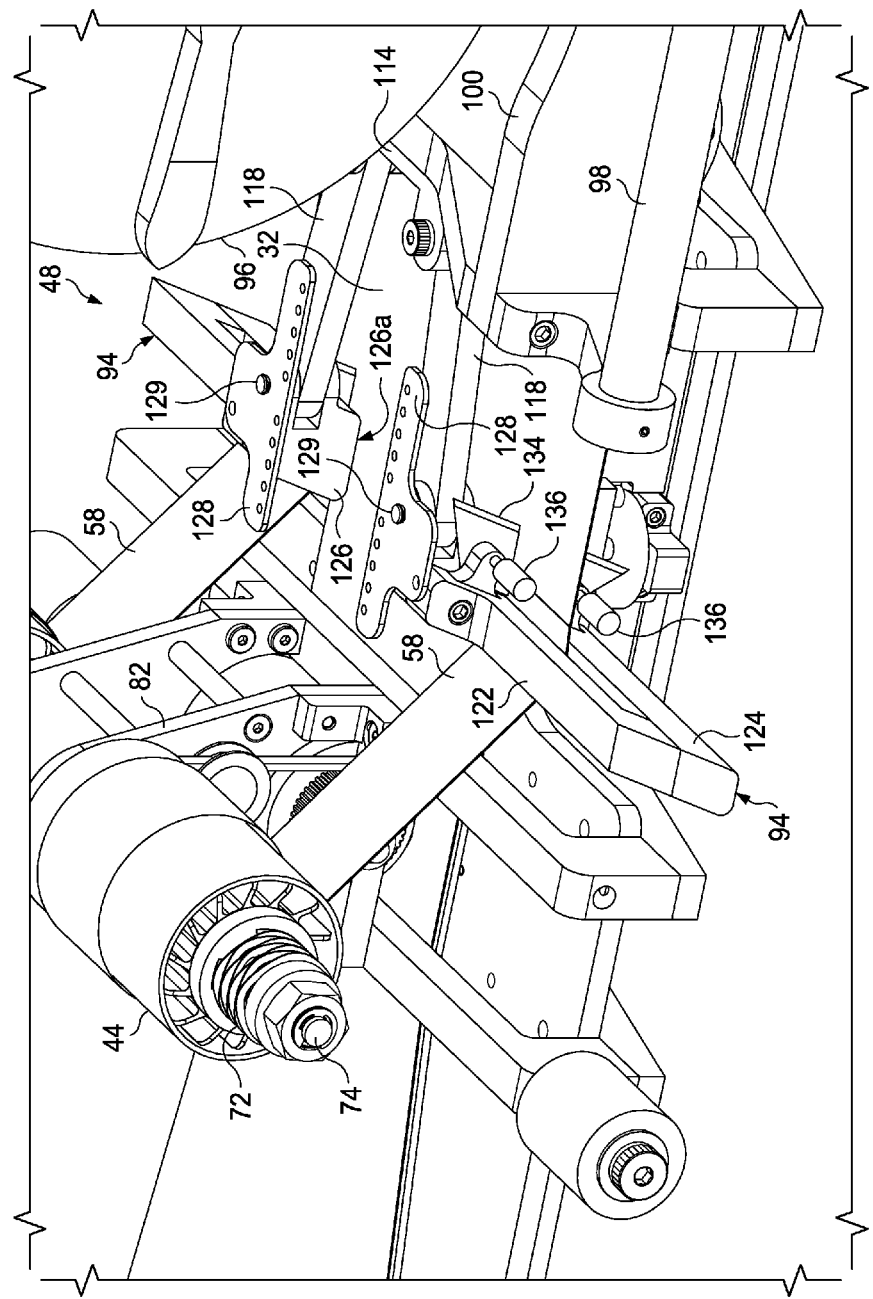
FIG. 22 is an illustration of a perspective view of the film cutter assembly shown in FIGS. 20 and 21, illustrating edges of a film being cut.

After the film 32 has been compacted beneath the compaction roller 46, the film cutter assembly 48 trims away edges of the film 32 to match the width of the flange surface 60a, even in cases where the width of the base flange surface 60a may vary along the length of the stringer 34. As best seen in FIG. 22, inward biasing of the link arms 118 results in the cutter knives 134 cutting the film 32 at the edges of the base flange surface 60a. The film scrap 58 passes through the guide slots 102 in the cutter follower arms 94 and is taken up on the scrap take-up rollers 44. The scrap take-up rollers 44 are belt driven by the rear traction tire 88. In the event that the scrap take-up rollers 44 rotate more slowly than the rear traction tire 88, the slip clutch 72 allows dynamic slipping of the rollers 44. FIG. 19 diagrammatically illustrates processing of the film 32 during the film material placement process. The film material 32 is drawn from the feed roll 96 and the backer 56 is rolled up on the backer take-up reel 42. The film 32 is compacted and then cut at 61. Film scrap 58 is rolled up onto the film scrap take-up reels 44 as the film 32 is cut to match the width of the flange surface 60a, including along the flange taper 68.

Figure 23:
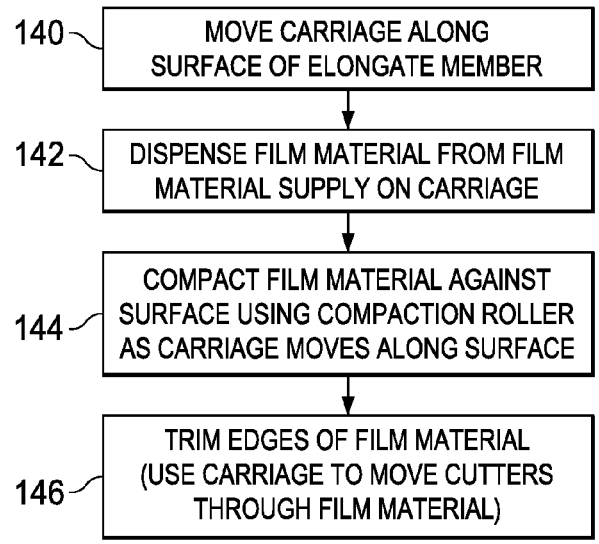
FIG. 23 is an illustration of a flow diagram of an embodiment of a method of applying a film material along a surface of elongate member.

FIG. 23 illustrates the overall steps of a method of applying film 32 to the surface 60a of an elongate member 34. At 140, a carriage 36 moved along the surface 60a of the elongate member 32, and at 142 the film 32 is dispensed from a film supply 40 on the carriage 36. At 144 the film 32 is compacted against the surface 60a using a compaction roller 46 as the carriage 36 moves along the surface 60a. At step 146, the edges of the film 32 are trimmed, using the carriage 36 to move cutter knives 134 through the film 32.

Figure 24:
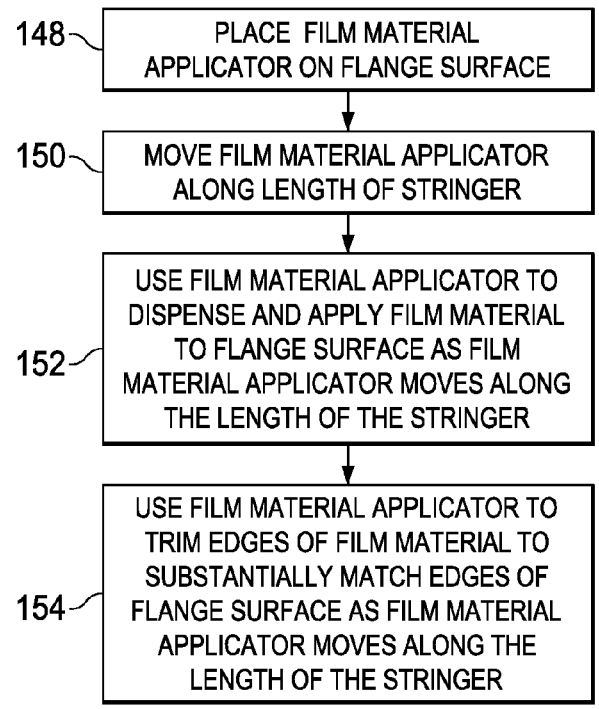
FIG. 24 is an illustration of a flow diagram of a method of using the film applicator to apply film material on the flange of a stringer.

FIG. 24 illustrates the overall steps of a method of applying film material 32 over the length of a base flange surface 60a on a composite stringer 34. Beginning at 148, an film material applicator 30 is placed on the flange surface 68a. At 150, the film applicator 30 is moved along the length of the stringer 34. At 152 the film applicator 30 is used to dispense and apply film material 32 to the flange surface 60a as the film applicator 30 moves along the length of the stringer 34. At 154, the film applicator 30 is used to trim edges of the film material 32 to substantially match edges of the flange surface 60a as the film applicator 30 moves along the length of the stringer 34.

Embodiments of the disclosure may find use in a variety of potential applications, particularly in the transportation industry, including for example, aerospace, marine, automotive applications and other application where automated layup equipment may be used. Thus, referring now to FIGS. 25 and 26, embodiments of the disclosure may be used in the context of an aircraft manufacturing and service method 160 as shown in FIG. 25 and an aircraft 162 as shown in FIG. 26. Aircraft applications of the disclosed embodiments may include, for example, without limitation, stringers, spars, doublers, and beams, to name only a few. During pre-production, exemplary method 160 may include specification and design 164 of the aircraft 162 and material procurement 166. During production, component and subassembly manufacturing 168 and system integration 170 of the aircraft 162 takes place. Thereafter, the aircraft 162 may go through certification and delivery 172 in order to be placed in service 174. While in service by a customer, the aircraft 162 is scheduled for routine maintenance and service 176, which may also include modification, reconfiguration, refurbishment, and so on.

Each of the processes of method 160 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 26, the aircraft 162 produced by exemplary method 160 may include an airframe 178 with a plurality of systems 180 and an interior 182. Examples of high-level systems 180 include one or more of a propulsion system 184, an electrical system 186, a hydraulic system 188, and an environmental system 190. Any number of other systems may be included. The disclosed method and apparatus may be employed to place and trim film material on one or more elongate components forming part of the airframe 178 or the interior 182 such as, without limitation, stringers and spars. Although an aerospace example is shown, the principles of the disclosure may be applied to other industries, such as the marine and automotive industries.

Systems and methods embodied herein may be employed during any one or more of the stages of the production and service method 160. For example, components or subassemblies corresponding to production process 168 may be fabricated or manufactured in a manner similar to components or subassemblies produced while the aircraft 162 is in service. Also, one or more apparatus embodiments, method embodiments, or a combination thereof may be utilized during the production stages 168 and 170, for example, by substantially expediting assembly of or reducing the cost of an aircraft 162. Similarly, one or more of apparatus embodiments, method embodiments, or a combination thereof may be utilized while the aircraft 162 is in service, for example and without limitation, to maintenance and service 176.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for applying film material to a flange surface of an elongate composite stringer, comprising:
    a carriage adapted to be mounted on and movable along the elongate composite stringer;
    a compaction roller mounted on the carriage for compacting film material against the flange surface as the carriage moves along the stringer;
    a film feed roll assembly on the carriage adapted to hold a quantity of film material and to dispense the film material to the compaction roller;
    a take-up reel on the carriage adapted for taking up a backing on the film material as the film material is being dispensed to the compaction roller;
    a heater on the carriage for heating the flange surface as the carriage moves along the composite stringer; and
    a film trimmer for trimming edges of the film material to match a contour of the composite stringer after the film material has been compacted against the flange surface.

2. The apparatus of claim 1, wherein the carriage includes:
    an upper frame adapted to be positioned above the flange surface and on which the compaction roller, film feed roll assembly, take-up reel, heater, and film trimmer are mounted, and
    a lower frame adapted to be disposed beneath the flange surface.

3. The apparatus of claim 2, further comprising:
    rollers on the lower frame for gripping the carriage against the elongate composite stringer.

4. The apparatus of claim 2, further comprising:
    a backer take-up reel mounted on the upper frame adapted for taking up a backer on the film material; and
    a drive coupled between the film feed roll assembly and the backer take-up reel for driving rotation of the backer take-up reel.

5. The apparatus of claim 1, wherein the film trimmer comprises:
    followers adapted to engage and follow opposite edges of the flange surface, and
    a pair of cutter knives respectively pivotally mounted on the followers and coupled with the followers for cutting the film along the opposite edges of the flange surface.

6. A method of applying film material to a surface of a composite stringer, comprising:
    moving a carriage along the surface of the composite stringer;
    dispensing film material from a film material supply on the carriage;
    compacting the film material against the surface of the composite stringer using a compaction roller on the carriage as the carriage moves along the surface of the composite stringer; and
    trimming edges of the film material that has been compacted against the surface of the composite stringer, including using the carriage to move at least one cutter through the film material as the carriage moves along the surface of composite stringer.

7. The method of claim 6, wherein the dispensing, compacting and trimming is performed in a single pass as the carriage moves along a surface of the composite stringer.

8. The method of claim 6, further comprising:
removing a backer from the film material being dispensed, and
accumulating the backer on a backer take-up reel on the carriage.

9. The method of claim 6, wherein trimming the edges of the film material includes:
drawing a pair of cutting knives through the film material as the carriage moves along a surface of the composite stringer,
following the edges of the surface of the composite stringer, and
moving the cutting knives to follow the edges of the surface of the composite stringer.

10. A method of applying film material over the length of a flange surface on a composite stringer, comprising:
placing a film material applicator on the flange surface;
moving the film material applicator along the length of the composite stringer;
using the film material applicator to dispense and apply film material to the flange surface as the film material applicator moves along the length of the composite stringer; and
using the film material applicator to trim edges of the film material to substantially match edges of the flange surface as the film material applicator moves along the length of the composite stringer.

11. The method of claim 10, wherein placing the film material applicator on the flange surface includes gripping the film material applicator against a top, a bottom and sides of the composite stringer.

12. The method of claim 10, wherein using the film material applicator to trim edges of the film material includes:
following edges of the flange surface,
moving cutting knives to follow the edges of the flange surface, and
using the cutting knives to cut edges of the film material along the edges of the flange surface.

13. The method of claim 12, further comprising:
taking up scrap film on a reel on the film material applicator produced by cutting the edges of the film material.

\* \* \* \* \*